US009127135B2

(12) United States Patent
Tsutsui et al.

(10) Patent No.: US 9,127,135 B2
(45) Date of Patent: Sep. 8, 2015

(54) EXPANDED COMPOSITE POLYSTYRENE-BASED RESIN PARTICLES AND EXPANDED MOLDED ARTICLE THEREOF

(75) Inventors: Yasutaka Tsutsui, Shiga (JP); Shingo Terasaki, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 13/984,040

(22) PCT Filed: Feb. 29, 2012

(86) PCT No.: PCT/JP2012/055122
§ 371 (c)(1),
(2), (4) Date: Aug. 7, 2013

(87) PCT Pub. No.: WO2012/121084
PCT Pub. Date: Sep. 13, 2012

(65) Prior Publication Data
US 2013/0310475 A1    Nov. 21, 2013

(30) Foreign Application Priority Data
Mar. 4, 2011    (JP) .................................. 2011-047791

(51) Int. Cl.
*C08J 9/35*    (2006.01)
*C08J 9/00*    (2006.01)
(Continued)

(52) U.S. Cl.
CPC .................. *C08J 9/35* (2013.01); *C08F 257/02* (2013.01); *C08F 285/00* (2013.01); *C08J 9/0061* (2013.01); *C08J 9/141* (2013.01); *C08J 9/18* (2013.01); *C08J 9/224* (2013.01); *C08J 9/232* (2013.01);

(Continued)

(58) Field of Classification Search
CPC .............. C08J 9/0061; C08J 9/16; C08J 9/18; C08J 9/20
See application file for complete search history.

(56) References Cited

U.S. PATENT DOCUMENTS 6,221,926 B1 * 4/2001 Oohara et al. .................. 521/59
6,239,224 B1 * 5/2001 Mørk et al. .................... 525/242
(Continued)

FOREIGN PATENT DOCUMENTS

EP    2 033 987    3/2009
EP    2 623 521    8/2013
(Continued)

OTHER PUBLICATIONS

Derwent abstract, WO 2009096327a1.*
(Continued)

*Primary Examiner* — Randy Gulakowski
*Assistant Examiner* — Christina Wales
(74) *Attorney, Agent, or Firm* — Greenblum & Bernstein, P.L.C.

(57) ABSTRACT

Expanded composite polystyrene-based resin particles having a plurality of cells and cell membranes separating the plurality of cells, said cell membranes including a polystyrene-based resin forming a continuous phase and polyacrylic acid alkyl ester-based resin fine particles dispersed in said continuous phase to form a dispersed phase, and said polystyrene-based resin being complexed with said polyacrylic acid alkyl ester-based resin fine particles, wherein said dispersed phase is present in the form of a plurality of layers in a cell membrane thickness direction in a cell membrane cross-section of said expanded composite polystyrene-based resin particles.

18 Claims, 4 Drawing Sheets

(51) Int. Cl.
*C08J 9/14* (2006.01)
*C08F 257/02* (2006.01)
*C08J 9/18* (2006.01)
*C08J 9/224* (2006.01)
*C08J 9/232* (2006.01)
*C08F 285/00* (2006.01)
*C08F 220/18* (2006.01)

(52) U.S. Cl.
CPC . *C08F 2220/1808* (2013.01); *C08F 2220/1825* (2013.01); *C08F 2220/1858* (2013.01); *C08J 2201/034* (2013.01); *C08J 2201/036* (2013.01); *C08J 2203/14* (2013.01); *C08J 2325/06* (2013.01); *C08J 2351/00* (2013.01); *C08J 2433/08* (2013.01)

(56) References Cited

U.S. PATENT DOCUMENTS

| | | | |
|---|---|---|---|
| 2009/0069455 | A1 | 3/2009 | Sekiya et al. |
| 2013/0184363 | A1* | 7/2013 | Tsutsui et al. .................. 521/59 |

FOREIGN PATENT DOCUMENTS

| JP | 56-011929 | | 2/1981 |
|---|---|---|---|
| JP | 56-067344 | | 6/1981 |
| JP | 03-182529 | | 8/1991 |
| JP | 2841303 | | 12/1998 |
| JP | 3462775 | | 11/2003 |
| JP | 4101379 | | 6/2008 |
| JP | 2011-026505 | | 2/2011 |
| JP | 2011-026506 | | 2/2011 |
| JP | 2011-026509 | | 2/2011 |
| JP | 2011-026511 | | 2/2011 |
| JP | 2011026505 A | * | 2/2011 |
| JP | 2011-068817 | | 4/2011 |
| JP | 2011068817 A | * | 4/2011 |
| JP | 5284987 B2 | * | 9/2013 |
| WO | 2009-096327 | | 8/2009 |
| WO | WO 2009096327 A1 | * | 8/2009 |

OTHER PUBLICATIONS

Britton, Robin. Update on Mouldable Particle Foam Technology. Smithers Rapra, 2009.*
Extended European Search Report for EP Patent Application No. 12754988.9, which is dated Apr. 28, 2014.
WPI-2011-B59170 (XP-002723381), which corresponds to JP-2011-026506 dated Feb. 10, 2011.
WPI-2011-B59171 (XP-002723380), which corresponds to JP-2011-026505 dated Feb. 10, 2011.
WPI-2011-D57875 (XP-002723379), which corresponds to JP-2011-068817 dated Apr. 7, 2011.
WPI-2011-B59167 (XP-002723382), which corresponds to JP-2011-026509 dated Feb. 10, 2011.
International Search Report for PCT/JP2012/055122, mailed on Mar. 27, 2012; along with an English translation.

* cited by examiner

EXPANDED COMPOSITE POLYSTYRENE-BASED RESIN PARTICLES AND EXPANDED MOLDED ARTICLE THEREOF

The present invention relates to expanded composite polystyrene-based resin particles and an expanded molded article thereof. In accordance with the present invention, expanded composite polystyrene-based resin particles that can be become an expanded molded article with superior impact resistance even at a highly expanded ratio and also with good appearance can be provided.

BACKGROUND TECHNOLOGY

Expanded molded articles comprising a polystyrene-based resin are diversely used as packaging materials and thermal insulating materials since they have superior cushioning properties and thermal insulating properties, as well as are readily molded. However, since impact resistance and resilience are insufficient, and thus cracks and chips readily form, there is the problem that such are not applicable to the packaging and the like of, for example, precision equipment products.

On the other hand, although expanded molded articles comprising a polypropylene-based resin are expanded molded articles having superior impact resistance and resilience, heavy equipment and facilities are required at the time of molding such. Also, due to the nature of the resin, such must be transported from the raw material manufacturer to the molder in the form of expanded particles, which becomes transportation of that having a high volume, thus causing the problem of increased production costs.

In recent years, rubber-modified styrene-based resin expanded molded articles, that is, expanded molded articles made of a high impact polystyrene resin (hereinafter, also referred to as "HIPS") in which an elastic component such as butadiene rubber is formulated in a polystyrene-based resin, having improved impact resistance and resilience than expanded articles comprising a polystyrene-based resin, as well as being readily molded, have been suggested (for example, refer to Japanese Unexamined Patent Application, First Publication No. S56-67344 (Patent Document 1), Japanese Patent No. 2841303 (Patent Document 2), Japanese Patent No. 4101379 (Patent Document 3), and Japanese Unexamined Patent Application, First Publication No. H03-182529 (Patent Document 4).

For example, in Patent Document 1, expanded particles having improved impact resistance comprising a resin in which non-oriented rubber particles are dispersed in polystyrene are disclosed.

However, since the rubber particles are non-oriented, there are the problems that it is difficult for deformation of rubber particles to occur; in the thin cell membrane forming an expanded article, it is easy for rubber particles to break-through from the cell membrane surface; and, particularly in pre-expanded particles having a highly expanded ratio, retention of the blowing agent gas becomes insufficient by breaking-through of the rubber particles.

Also, in Patent Document 2, an expanded article of a resin formed by mechanically mixing HIPS and a hydrogenated styrene-butadiene block copolymer is disclosed.

However, since a mechanically-mixed rubber component is included in this expanded article, when dispersion of the mixed rubber component is insufficient, there is the problem that dispersion of the rubber component in the expanded article cell membrane becomes unhomogeneous and it is easy for cells to become in communication with each other (production of continuous cells). This tendency is particularly remarkable when expanded at a highly expanded ratio, and the expansion force of expanded particles having a highly expanded ratio decreases to thereby generate voids between particles in the expanded molded article, and thus the appearance of the expanded molded article deteriorates. Also, although the impact resistance of this expanded molded article is improved compared to conventional polystyrene-based expanded molded articles, it is still at a level insufficient for actual use.

Also, Japanese Patent No. 3462775 (Patent Document 5) discloses an expanded molded article of a rubber-modified styrene-based resin composition in which particles of a diene-based rubber encapsulating a polystyrene-based resin are dispersed in a continuous phase comprising a polystyrene-based resin.

PRIOR ART DOCUMENTS

Patent Documents

Patent Document 1: Japanese Unexamined Patent Application, First Publication No. S56-67344
Patent Document 2: Japanese Patent No. 2841303
Patent Document 3: Japanese Patent No. 4101379
Patent Document 4: Japanese Unexamined Patent Application, First Publication No. H03-182529
Patent Document 5: Japanese Patent No. 3462775

SUMMARY OF THE INVENTION

Problem to be Solved by the Invention

Conventionally, regardless of HIPS improving impact resistance of polystyrene-based resins, for the polystyrene-based resin expanded molded articles disclosed in the above-mentioned prior art, particularly when an expanded molded article having a highly expanded ratio is attempted to be obtained, not only is there deterioration in the appearance of the expanded molded article such as shrinkage and the like, impact resistance is also decreased. For this reason, expanded molded articles could not be used at highly expanded ratios and there was a limit to resource saving of packaging materials. It is presumed that this is caused by, when expandable polystyrene-based resin particles are produced using HIPS, if resilience is poor in the formulated elastic component such as butadiene rubber, particularly for the case when there is a highly expanded ratio, since the thickness of the cell membrane of the expanded particles becomes thin, the particles cannot be oriented well in the cell membrane and it becomes easy for rubber particles to break-through from the cell membrane surface, resulting in decrease in retention of a volatile blowing agent as well as it becoming easy for cells to become in communication with each other.

Therefore, the present invention solved the above-mentioned problem and has the object of providing expanded composite polystyrene-based resin particles to become an expanded molded article with superior impact resistance even at a highly expanded ratio and also good appearance, and such expanded molded article.

Means for Solving the Problem

Thus, in accordance with the present invention, expanded composite polystyrene-based resin particles having a plurality of cells and cell membranes separating the plurality of cells, said cell membranes including a polystyrene-based resin forming a continuous phase and polyacrylic acid alkyl ester-based resin fine particles dispersed in said continuous phase to form a dispersed phase, and said polystyrene-based resin being complexed with said the polyacrylic acid alkyl ester-based resin fine particles, wherein said dispersed phase is present in the form of a plurality of layers in a cell membrane thickness direction in a cell membrane cross-section of said expanded composite polystyrene-based resin particles are provided.

Also, in accordance with the present invention, a composite polystyrene-based resin expanded molded article having a plurality of cells and cell membranes separating the plurality of cells, said cell membranes including a polystyrene-based resin forming a continuous phase and polyacrylic acid alkyl ester-based resin fine particles dispersed in said continuous phase to form a dispersed phase, and said polystyrene-based resin being complexed with said polyacrylic acid alkyl ester-based resin fine particles, wherein said dispersed phase is present in the form of a plurality of layers in a cell membrane thickness direction in a cell membrane cross-section of said composite polystyrene-based resin expanded molded article is provided.

Effects of the Invention

In accordance with the present invention, expanded composite polystyrene-based resin particles to become an expanded molded article with superior impact resistance even at a highly expanded ratio and also good appearance, and such expanded molded article can be provided.

That is, the expanded composite polystyrene-based resin particles of the present invention are expanded particles comprising a composite polystyrene-based resin in which polyacrylic acid alkyl ester-based resin fine particles are dispersed in the continuous phase of the polystyrene-based resin, and have a distributed structure in which, when viewed in cross-section from the thickness direction of the cell membrane of the expanded particles, the polyacrylic acid alkyl ester-based resin fine particles are present in the form of a plurality of layers in the thickness direction.

Accordingly, when this is filled into the cavity of a mold die, and heated and expansion molded in the mold to produce an expanded molded article, the polyacrylic acid alkyl ester-based resin fine particles are present in the form of layers in a thickness direction of the cell membrane, that is, the polyacrylic acid alkyl ester-based resin fine particles are well oriented in the cell membrane. Since the cells do no become so as to be in communication by the polyacrylic acid alkyl ester-based resin fine particles breaking-through from the cell membrane surface and also retention of the volatile blowing agent can be well maintained, a composite polystyrene-based resin expanded molded article superior in all of mechanical strength, moldabilty, and impact resistance can be provided.

Also, in accordance with the present invention, if the dispersed phase, when a and b are respectively a dimension in the cell membrane thickness direction (thickness of polyacrylic acid alkyl ester-based resin fine particles) and a dimension in the cell membrane surface direction (length of polyacrylic acid alkyl ester-based resin fine particles) in the cell membrane cross-section of the expanded composite polystyrene-based resin particles, has an aspect ratio (b/a) of 7 or more and 60 or less, preferably 20 or more and 50 or less, a composite polystyrene-based resin expanded molded article with more superior mechanical strength, moldabilty, and impact resistance can be provided.

Also, in accordance with the present invention, if the polystyrene-based resin has a weight-average molecular weight (Mw) of 200,000 to 350,000 and a ratio (Mz/Mw) of the Z-average molecular weight (Mz) to the weight-average molecular weight (Mw) of 2 to 4, a composite polystyrene-based resin expanded molded article with more superior mechanical strength, moldabilty, and impact resistance can be provided.

Also, in accordance with the present invention, if the polyacrylic acid alkyl ester-based resin fine particles are formed from a polymer of ethyl acrylate, butyl acrylate, 2-ethylhexyl acrylate, or a mixture thereof, and furthermore, if the polyacrylic acid alkyl ester-based resin fine particles are from 5 to 100 parts by weight with respect to 100 parts by weight of said polystyrene-based resin, a composite polystyrene-based resin expanded molded article with more superior mechanical strength, moldabilty, and impact resistance can be provided.

Also, in accordance with the present invention, if the expanded composite polystyrene-based resin particles further comprise a component derived from a polybutadiene-terminated acrylate, a composite polystyrene-based resin expanded molded article with further improved impact resistance by compatibilization of polystyrene-based resin and the polyacrylic acid alkyl ester-based resin can be provided.

Compatibilization used herein means that the polyacrylic acid alkyl ester-based resin fine particles exist phase-dispersed, but may be present in the polystyrene-based resin with a part or all thereof being bonded with the polystyrene-based resin in any ways, for example, bonded by graft-polymerization, and this is considered to contribute to improvement of impact resistance.

Also, in accordance with the present invention, if the expanded composite polystyrene-based resin particles have a bulk density of 0.015 $g/cm^3$ or more and 0.1 $g/cm^3$ or less, a composite polystyrene-based resin expanded molded article with more superior mechanical strength, moldabilty, and impact resistance can be provided.

Also, in accordance with the present invention, when the expanded composite polystyrene-based resin particles are formed by pre-expanding expandable polystyrene-based resin particles containing 2 to 10% by weight of a volatile blowing agent having pentane as a main component with respect to the expandable polystyrene-based resin particles, a composite polystyrene-based resin expanded molded article with more superior mechanical strength, moldabilty, and impact resistance can be provided.

Also, in accordance with the present invention, if the expanded composite polystyrene-based resin particles are surface-coated with an antistatic agent-containing component, a composite polystyrene-based resin expanded molded article with superior antistatic properties can be provided.

BEST MODE FOR CARRYING OUT THE INVENTION

Figure 1A:
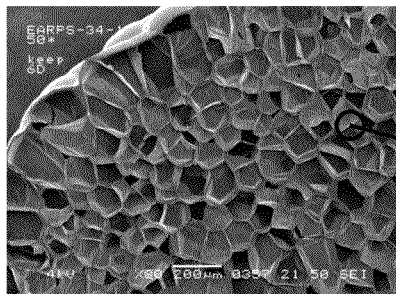
FIG. 1(*a*) is a scanning electron microscope (SEM) photograph of the cross-section of the expanded particles of Example 1 and FIG. 1(*b*) is a transmission electron microscope (TEM) photograph of the cell membrane cross-section of the expanded particles of Example 1.

The expanded composite polystyrene-based resin particles (hereinafter, also referred to as "expanded particles") are characterized by having a plurality of cells and cell membranes separating the plurality of cells, said cell membranes including a polystyrene-based resin forming a continuous phase and polyacrylic acid alkyl ester-based resin fine particles dispersed in the continuous phase to form a dispersed phase, and the polystyrene-based resin being complexed with the polyacrylic acid alkyl ester-based resin fine particles, wherein said dispersed phase is present in the form of a plurality of layers in a cell membrane thickness direction in a cell membrane cross-section of the expanded composite polystyrene-based resin particles.

In other words, "composite polystyrene-based resin" in the expanded particles of the present invention means a resin in which a polystyrene-based resin and a polyacrylic acid alkyl ester-based resin have been combined (complexed).

Also, from the "composite polystyrene-based resin" being in a form in which a dispersoid consisting of polyacrylic acid alkyl ester-based resin fine particles are dispersed in a dispersion medium consisting of a polystyrene-based resin, the former is referred to as "dispersed phase" and the latter is referred to as "continuous phase".

(Polystyrene-Based Resin Particles: Continuous Phase)

There are no particular limitations to the polystyrene-based resin constituting the continuous phase of the expanded composite polystyrene-based resin particles of the present invention as long as such is a resin having a styrene-based monomer as the main component, and styrene or a styrene derivative alone or as a copolymer can be mentioned.

As styrene derivatives, α-methylstyrene, vinyl toluene, chlorostyrene, ethylstyrene, isopropylstyrene, dimethylstyrene, bromostyrene, and the like can be mentioned. These styrene-based monomers may be used alone or may be combined.

The polystyrene-based resin may be a resin that is combined with a vinyl-based monomer copolymerizable with a styrene-based monomer.

As examples of vinyl-based monomers, for example, multifunctional monomers such as divinylbenzenes such as o-divinylbenzene, m-divinylbenzene, and p-divinylbenzene, and alkylene glycol di(meth)acrylates such as ethylene glycol di(meth)acrylate and polyethylene glycol di(meth)acrylate; α-methylstyrene; (meth)acrylonitrile; methyl (meth)acrylate; butyl (meth)acrylate; and the like can be mentioned. Among these, multifunctional monomers are preferable, ethylene glycol di(meth)acrylate, polyethylene glycol di(meth)acrylates in which n is 4 to 16, and divinylbenzenes are more preferable, and divinylbenzenes and ethylene glycol di(meth)acrylate are particularly preferable. The combined monomers may be used alone or may be combined.

Also, when combined monomers are used, it is preferable that the content thereof is set so that the styrene-based monomer is an amount so as to become the main component (for example, 50% by weight or more).

In the present invention, "(meth)acryl" means "acryl" or "methacryl".

The polystyrene-based resin preferably has a weight-average molecular weight (Mw) of from 200,000 to 350,000 and a ratio (Mz/Mw) of the Z-average molecular weight (Mz) to the weight-average molecular weight (Mw) of from 2 to 4.

When the weight-average molecular weight (Mw) is less than 200,000, orientation of the polyacrylic acid alkyl ester-based resin fine particles in the cell membrane becomes difficult and there thus may be a decrease in impact resistance when made into an expanded molded article. On the other hand, when the weight-average molecular weight (Mw) exceeds 350,000, expandability decreases when the expanded composite polystyrene-based resin particles are expansion molded and extension of the expanded molded article surface is insufficient, and thus the appearance of the expanded molded article may be inferior.

Specifically, the Mw is, for example, 200,000, 250,000, 300,000, 350,000, and the like.

Also, when the ratio (Mz/Mw) of the Z-average molecular weight (Mz) to the weight-average molecular weight (Mw) is less than 2, orientation of the polyacrylic acid alkyl ester-based resin fine particles in the cell membrane becomes difficult and there thus may be a decrease in impact resistance when made into an expanded molded article. On the other hand, when the ratio (Mz/Mw) of the Z-average molecular weight (Mz) to the weight-average molecular weight (Mw) exceeds 4, expandability decreases when the expanded composite polystyrene-based resin particles are expansion molded and extension of the expanded molded article surface is insufficient, and thus the appearance of the expanded molded article may be inferior.

A more preferable weight-average molecular weight (Mw) is from 230,000 to 330,000 and a more preferable ratio (Mz/Mw) of the Z-average molecular weight (Mz) to the weight-average molecular weight (Mw) is from 2 to 3.

Specifically, Mz/Mw is, for example, 2.0, 2.5, 3.0, and the like.

(Polyacrylic Acid Alkyl Ester-Based Resin Fine Particles: Dispersed Phase)

There are no particular limitations to the polyacrylic acid alky ester-based resin fine particles constituting the dispersed phase of the expanded composite polystyrene-based resin particles of the present invention as long as such are particles of a resin having an acrylic acid alkyl ester-based monomer as the main component. For example, methyl acrylate, ethyl acrylate, propyl acrylate, butyl acrylate, pentyl acrylate, 2-ethylhexyl acrylate, hexyl acrylate, and the like can be mentioned. Among these, ethyl acrylate, butyl acrylate, and 2-ethylhexyl acrylate are preferable. These acrylic acid alkyl ester-based monomers may be used alone or may be combined. The number of carbons of the above-mentioned "alkyl" is 1 to 30.

Accordingly, the polyacrylic acid alkyl ester-based resin fine particles are preferably formed from a polymer of ethyl acrylate, butyl acrylate, 2-ethylhexyl acrylate, or a mixture of thereof.

The polyacrylic acid alkyl ester-based resin fine particles are preferably 5 to 100 parts by weight with respect to 100 parts by weight of the polystyrene-based resin.

If the weight ratio of the resin fine particles is within the above-mentioned range, a composite polystyrene-based resin expanded molded article having more superior mechanical strength, moldability, and impact resistance can be provided.

When the resin fine particles are less than 5 parts by weight with respect to 100 parts by weight of the polystyrene-based resin, the effect of improvement in the impact resistance of the obtained composite polystyrene-based resin expanded molded article may not be sufficiently achieved. On the other hand, when the resin fine particles exceed 100 parts by weight with respect to the 100 parts by weight of the polystyrene-based resin, expanding the obtained expandable composite polystyrene-based resin particles at a highly expanded ratio becomes difficult and thus making an expanded molded article with a low density may not be possible. The resin fine particles are more preferably 10 to 70 parts by weight with respect to 100 parts by weight of the polystyrene-based resin.

Specific amounts of the polyacrylic acid alkyl ester-based resin fine particles are, for example, 5, 10, 15, 20, 25, 30, 50, 70, 75, 100 parts by weight, and the like with respect to 100 parts by weight of the polystyrene-based resin.

In the present invention, the proportion of the resin and monomer, which become raw materials, are roughly equivalent to the proportion of these in the expanded particles and the expanded molded article.

The dispersed phase of the expanded composite polystyrene-based resin particles of the present invention, looking from the cross-section in the thickness direction of the cell membrane of the expanded composite polystyrene-based resin particles, has a structure in which the polyacrylic acid alkyl ester-based resin fine particles are present in the form of a plurality of layers in the thickness direction.

In the present invention, if considered from the cell membrane unit in the expanded particles and the expanded molded article, it is considered that the fine particles are roughly homogeneously dispersed. From such viewpoint, the distributed state of the fine particles in the dispersed phase is roughly homogeneous in the expanded particles and the expanded molded article.

The dispersed phase, looking at from the cross-section in the thickness direction of the cell membrane of the expanded particles, when taken as a dimension in the cell membrane thickness direction of the dispersed phase (thickness a of the resin fine particles) and a dimension in the cell membrane surface direction of the dispersed phase (length b of the resin fine particles), preferably has an aspect ratio (b/a) of 7 or more and 60 or less.

If the aspect ratio (b/a) is less than 7, it becomes easy for resin fine particles to break-through from the cell membrane and thus retention of the blowing agent gas may decrease. In contrast, if the aspect ratio (b/a) exceeds 60, the resin fine particles become excessively biased and thus become thin, making it difficult to prevent the propagation of cracking, and thus impact resistance of the expanded molded article may decrease.

A more preferable aspect ratio (b/a) is 10 or more and 60 or less, and a further preferable aspect ratio (b/a) is 20 or more and 50 or less.

Specifically, b/a is, for example, 10, 15, 20, 25, 30, 35, 45, 50, 55, 60, and the like.

The same also applies for the expanded molded article, and the thickness a and the length b in the expanded particles are represented by rewriting as c and d respectively.

This aspect ratio and the measurement method thereof are explained in detail in Examples.

In the present invention, the shape of the resin fine particles in the composite polystyrene-based resin particles before expansion is not particularly limited and, for example, can be spherical, oval-shaped, an amorphous shape, and the like.

Also, the shape of the resin fine particles in the cell membrane cross-section of the expanded particles after expansion is not particularly limited and, for example, can be circular, elliptical, amorphous, and the like.

Also, the average particle diameter of the resin fine particles in the composite polystyrene-based resin particles before expansion is preferably 100 to 1,000 nm.

When the average particle diameter of the resin fine particles is less than 100 nm, impact resistance of the obtained expanded molded article may become insufficient. On the other hand, when the average particle diameter of the resin fine particles exceeds 1,000 nm, the dissipation rate of the blowing agent may increase. A more preferable average particle diameter of the resin fine particles is 200 to 500 nm.

Specific average particle diameters are, for example, 100, 200, 250, 500, 750, 1,000 nm, and the like.

(Composite Polystyrene-Based Resin Particles)

In the present invention, there are no particular limitations to the shape of the composite polystyrene-based resin particles and, for example, can be spherical, oval-shaped, cylindrical, and the like. Spherical is preferable.

When the composite polystyrene-based resin particles of the present invention are spherical, the average particle diameter thereof, considering thereafter filling ability in a mold die of expanded particles in which expandable composite polystyrene-based resin particles impregnated with a volatile blowing agent filling are further expanded and the like, is preferably 0.3 to 2.0 mm and more preferably 0.5 to 1.5 mm.

Specific average particle diameters are, for example, 0.3, 0.5, 0.8, 1.0, 1.5, 2.0 mm, and the like.

(Polybutadiene-Terminated Acrylate)

A component derived from a polybutadiene-terminated acrylate is preferably further included in the composite polystyrene-based resin particles.

A composite polystyrene-based resin expanded molded article with further improved impact resistance by compatibilization of polystyrene and the polyacrylate can be provided thereby.

A monomer having a structure in which one or more (meth)acryloyl groups are bonded to polybutadiene molecules containing 80% or more 1,2-bonds and 1,4-bonds can be used in the polybutadiene-terminated acrylate. This monomer preferably has a structure in which a meth)acryloyl) group is introduced to a polybutadiene molecule terminal. Specifically, the polybutadiene-terminated acrylate is a monomer having polybutadiene molecules containing the below-mentioned repetitive unit (1) by 1,2 bonding and the below-mentioned repetitive unit (2) by 1,4 bonding, and a functional group ((meth)acryloyl group) represented by formula (3) below at one or both terminals of the polybutadiene molecules.

[Formula 1]

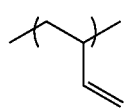

(1)

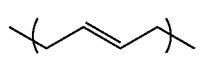

(2)

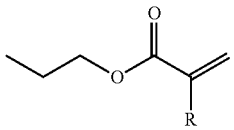

(3)

The molar ratio of units (1) and (2) is preferably (1)/[(1)+(2)]≥0.8. Unit (2) may have a trans-structure or may have a cis-structure. Also, the units (1) and (2) can exist in various repetitive forms, such as, random, block, and alternate, in the monomer.

In formula (3), R is preferably a hydrogen atom or a lower alkyl group having 1 to 4 carbons. The functional group of formula (3) is preferably positioned at both terminals of a polybutadiene molecule.

As the polybutadiene-terminated acrylate, for example, the product names BAC-45 and BAC-15, acquirable from Osaka Organic Chemical Industry Ltd., and the like can be used. Also, a newly synthesized product by the known method below can also be used.

That is, a method of introducing a (meth)acryl group into a polybutadiene structure by reacting a hydroxyl group-containing polybutadiene and a compound having a (meth)acryl group can by mentioned.

As the above-mentioned method, for example, (i) a method of carrying out a dehydration reaction with the hydroxyl group of the hydroxyl group-containing polybutadiene and the carboxyl group of the compound having a (meth)acryl group using a dehydration catalyst such as p-toluene sulfonic acid, and (ii) a method of carrying out a transesterification reaction with a (meth)acrylic acid ester and the hydroxyl group of the polybutadiene using a transesterification catalyst such as a titanium catalyst or a tin catalyst can be mentioned.

As compounds having a (meth)acryl group, for example, (meth)acrylic acid, methyl (meth)acrylate, ethyl (meth)acrylate, propyl (meth)acrylate, butyl (meth)acrylate, and the like can be mentioned (propyl and butyl include structural isomers).

The polybutadiene-terminated acrylate preferably has a number-average molecular weight in the range of from 200 to 10,000. When the number-average molecular weight is less than 200, elasticity of the composite polystyrene-based resin particles may decrease. When the number-average molecular weight exceeds 10,000, charging and dissolving in the reaction system may be difficult. A more preferable number-average molecular weight is in the range of from 2,500 to 3,000. Number-average molecular weight as used herein is the value obtained by measuring with a gel permeation chromatograph.

Specific number-average molecular weights are, for example, 200, 1,000, 1,500, 2,000, 2,500, 3,000, 3,500, 5,000, 10,000, and the like.

The polybutadiene-terminated acrylate preferably has a viscosity (25° C.) in the range of from 500 to 9,000 Pa·s. When the viscosity is less than 500 Pa·s, elasticity of the composite polystyrene-based resin particles may decrease. When the viscosity exceeds 9,000 Pa·s, charging and dissolving in the reaction system may be difficult. A more preferable viscosity is in the range of from 4,000 to 8,000 Pa·s. Viscosity as used herein is the value obtained by measuring with a rotational viscometer.

The component derived from a polybutadiene-terminated acrylate is preferably included in the composite polystyrene-based resin particles in the range of 0.1 to 3.0 parts by weight with respect to 100 parts by weight of the composite polystyrene-based resin particles. When the content of this component is less than 0.1 parts by weight, elasticity of the composite polystyrene-based resin particles may decrease. When the content of this component exceeds 3.0 parts by weight, absorption in the composite polystyrene-based resin particles may become difficult. A more preferable content is in the range of from 0.1 to 2.0 parts by weight and particularly in the range of 0.5 to 1.0 parts by weight.

Specific amounts of the polybutadiene-terminated acrylate are, for example, 0.1, 0.3, 0.5, 0.8, 1.0, 1.5, 2.0, 3.0 parts by weight, and the like with respect to 100 parts by weight of the composite polystyrene-based resin particles.

(Expanded Composite Polystyrene-Based Resin Particles)

In the present invention, the expanded composite polystyrene-based resin particles preferably have a bulk density of 0.015 g/cm$^3$ or more and 0.1 g/cm$^3$ or less.

If the bulk density of the expanded particles is within the above-mentioned range, a composite polystyrene-based resin expanded molded article with more superior mechanical strength, moldabilty, and impact resistance can be provided.

When the bulk density of the expanded particles is less than 0.015 g/cm$^3$, impact resistance of the expanded molded article may decrease. On the other hand, when the bulk density of the particles exceeds 0.1 g/cm$^3$, the weight of the expanded molded article increases when used as a packaging material or a cushioning material, and thus may become economically disadvantaged. A more preferable bulk density of the expanded particle is 0.018 g/cm$^3$ or more and 0.05 g/cm$^3$ or less.

Specific bulk densities are, for example, 0.015, 0.018, 0.02, 0.03, 0.04, 0.05, 0.08, 0.1, and the like.

The resin fine particles in the cell membrane cross-section of the expanded particles of the present invention become a specific biased shape means that, in the process of expanding the resin, that is, the process in which the cell membrane is extended with expansion of the cells, the resin fine particles in the dispersed phase are moderately extended with extension of the polystyrene-based resin particles forming the continuous phase. This means that the viscoelasticity, in other words, molecular weight, of the polystyrene-based resin forming the continuous phase must be in a specific range. Accordingly, the polystyrene-based resin preferably has a weight average molecular weight (Mw) and a ratio (Mz/Mw) of the Z-average molecular weight (Mz) with respect to the weight average molecular weight (Mw) like the above-mentioned ranges.

The expanded composite polystyrene-based resin particles of the present invention can be produced by pre-expanding expandable composite polystyrene-based resin particles impregnated with a volatile blowing agent to a specific bulk density (for example, from 0.015 to 0.1 g/m$^3$) by a known method in the art.

The expandable composite polystyrene-based resin particles of the present invention can be produced by, for example, a step in which, in an aqueous medium, after a monomer mixture comprising an acrylic acid alkyl ester is absorbed into seed particles comprising a polystyrene-based resin, dispersedly-forming polyacrylic acid alkyl ester-based resin fine particles in the seed particle by polymerizing the monomer mixture; a step in which, in the aqueous medium, after a monomer mixture comprising a styrene-based monomer is absorbed into the seed particles in which the polyacrylic acid alkyl ester-based resin fine particles in the seed particle have been dispersedly formed, polymerizing the monomer mixture to further grow the polystyrene-based resin particles; and a step of impregnating a blowing agent after or during such polymerization.

More specifically, the expandable composite polystyrene-based resin particles of the present invention, can be produced by a first polymerization step in which 10 to 90 parts by weight of an acrylic acid alkyl ester-based monomer with respect to 100 parts by weight of the seed particles comprising a polystyrene-based resin are supplied to a dispersion solution in which seed particles comprising a polystyrene-based resin are dispersed in a dispersion fluid formed by dispersing seed particles comprising polystyrene resin in water, and this acrylic acid alkyl ester-based monomer is absorbed into the seed particles and polymerized to grow polystyrene-based resin particles; a second polymerization step in which subsequently a styrene-based monomer is supplied to this dispersion fluid, and such is absorbed into the seed particles and polymerized to further grow expanded polystyrene-based resin particles; and a step of impregnating a blowing agent after or during such polymerization.

The acrylic acid alkyl ester-based monomer and the used amount thereof in the first polymerization step and the styrene-based monomer used in the second polymerization step are as disclosed in "(Polyacrylic Acid Alkyl Ester-Based Resin Fine Particles)" and "(Polystyrene-Based Resin Particles)".

(Seed Particles)

There are no particular limitations on the seed particles comprising a polystyrene-based resin and can be produced by a known method in the art. For example, suspension polymerization methods, and methods of, after melting and kneading the raw material resin in an extruder, extruding as strand shapes and cutting to desired diameters can be mentioned. Also, a polystyrene-based resin recycled product can be used in a part or all thereof, and the seed particles may be the particles obtained by the suspension polymerization method or the cutting method as is, or may be particles obtained by impregnating a styrene-based monomer in such particles and polymerizing in an aqueous medium.

The particle diameter of the seed particles can be appropriately adjusted according to the average particle diameter and the like of the produced composite polystyrene-based resin particles. For example, when composite polystyrene-based resin particles having an average particle diameter of 1 mm are produced, preferably seed particles having an average particle diameter of about from 0.4 to 0.7 mm are used.

Also, although there are no particular limitations to the weight-average molecular weight of the seed particles, from 150,000 to 700,000 is preferable and from 200,000 to 500,000 is more preferable.

(Other Components)

In a range that does not impair physical properties, additives such as plasticizers, binding inhibitors, cell regulators, cross-linking agents, fillers, flame retardants, flame retardant auxiliary agents, lubricants, coloring agents, and the like may be added to the seed particles.

(Polymerization Initiator)

As the polymerization initiator used in the above-mentioned production method, there are no particular limitations as long as such has been conventionally used in the polymerization of styrene-based monomers and, for example, organic peroxides such as benzoyl peroxide, lauryl peroxide, t-butyl peroxybenzoate, t-butyl peroxy-2-ethylhexanoate, t-butyl peroxide, t-butyl peroxypivalate, t-butyl peroxyisopropylcarbonate, t-butyl peroxyacetate, 2,2-bis(t-butylperoxy)butane, t-butylperoxy-3,3,5-trimethylhexanoate, di-t-butylperoxy-hexahydroterephthalate, 2,2-di-t-butylperoxybutane, di-t-hexylperoxide, and dicumyl peroxide; azo compounds such as azobisisobutyronitrile and azobisdimethylvaleronitrile; and the like can be mentioned. Although these may be used alone or may be combined, preferably multiple types of polymerization initiators at a pyrolysis temperature of 60 to 130° C. are combined in order to obtain a 10-hour half-life.

(Suspension Stabilizer)

Also, in the above-mentioned production, a suspension stabilizer may be used in order to stabilize dispersion of styrene-based monomer droplets and polystyrene-based resin seed particles. As such suspension stabilizer, there are no particular limitations as long as such has been conventionally used in the polymerization of styrene-based monomers and, for example, water-soluble polymers such as polyvinyl alcohol, methyl cellulose, polyacrylamide, and polyvinyl pyrrolidone; poorly-soluble inorganic compounds such as tribasic calcium phosphate and magnesium pyrophosphate; and the like can be mentioned.

Also, when a poorly-soluble inorganic compound is used, normally an anionic surfactant is combined.

As such anionic surfactant, for example, fatty acid soap; N-acylamino acids or salts thereof; carboxylates such as alkyl ether carboxylates; sulfonates such as alkyl benzene sulfonates, alkyl naphthalene sulfonates, dialkyl sulfosuccinic acid ester salts, alkyl sulfoacetates and α-olefin sulfonates; sulfuric acid ester salts such as higher alcohol sulfuric acid ester salts, secondary higher alcohol sulfuric acid ester salts, alkyl ether sulfates, and polyoxyethylene alkyl phenyl ether sulfates; phosphoric acid ester salts such as alkyl ether phosphoric acid ester salts and alkyl phosphoric acid ester salts; and the like can be mentioned.

(Other Components)

In a range that does not impair physical properties, additives such as plasticizers, binding inhibitors, cell regulators, cross-linking agents, fillers, flame retardants, flame retardant auxiliary agents, lubricants, coloring agents, and the like may be added to the composite polystyrene-based resin particles.

Also, powdered metal soaps such as zinc stearate may be coated on the surface of the after-mentioned expandable composite polystyrene-based resin particles. By this coating, linking between expanded particles can be reduced in the pre-expansion step of the expandable polystyrene-based resin particles.

In the composite polystyrene-based resin particles, a plasticizer whose boiling point exceeds 200° C. at 1 atm can be included in order to maintain good expansion moldability even if the pressure of the steam used at the time of heat expansion is low.

As plasticizers, for example, phthalic acid esters; glycerin fatty acid esters such glycerin diacetomonolaurate, glycerin tristearate, and glycerin diacetomonostearate; adipic acid esters such as diisobutyl adipate; coconut oil; and the like can be mentioned.

The content of the plasticizer in the composite polystyrene-based resin particles is less than 2% by weight.

The expanded composite polystyrene-based resin particles of the present invention are preferably surface coated with an antistatic agent-containing component.

As the surface coating, for example, a method in which an antistatic agent is coated on the surface of composite polystyrene-based resin particles can be mentioned. Specifically, stirring the antistatic agent with the composite polystyrene-based resin particles in a mixer is preferable, and as the stirrer, a stirrer such as a tumbler mixer or a Loedige mixer can be used.

As antistatic agents, there are, for example, nonionic surfactants such as hydroxyalkyl amines, hydroxyalkyl monoether amines, glycerin fatty acid esters, and polyoxyethylene alkyl ethers; anionic surfactants such as alkyl sulfonates and alkylbenzene sulfonate; cationic surfactants such as tetraalkyl ammonium salts and trialkylbenzyl ammonium salts; and the like. Nonionic surfactants such as hydroxyalkyl amines, hydroxyalkyl monoether amines, glycerin fatty acid esters, and polyoxyethylene alkyl ethers can be mentioned.

As specific examples of such antistatic agents, N,N-bis (hydroxyethyl)dodecylamine, N,N-bis(hydroxyethyl)tetradecylamine, N,N-bis(hydroxyethyl)hexadecylamine, N,N-bis(hydroxyethyl)octadecylamine, N-hydroxyethyl-N-(2-hydroxytetradecyl)amine, N-hydroxyethyl-N-(2-hydroxyhexadecyl)amine, N-hydroxyethyl-N-(2-hydroxyoctadecyl) amine, N-hydroxypropyl-N-(2-hydroxytetradecyl)amine, N-hydroxybutyl-N-(2-hydroxytetradecyl)amine, N-hydroxypentyl-N-(2-hydroxytetradecyl)amine, N-hydroxypentyl-N-(2-hydroxyhexadecyl)amine, N-hydroxypentyl-N-(2-hydroxyoctadecyl)amine, N,N-bis(2-hydroxyethyl) dodecylamine, N,N-bis(2-hydroxyethyl)tetradecylamine, N,N-bis(2-hydroxyethyl)hexadecylamine, N,N-bis(2-hydroxyethyl)octadecyl amine, glycerin monostearate, glycerin distearate, sodium dodecyl benzene sulfonate, sodium alkylbenzene sulfonate, polyethylene glycol, polyoxyethylene oleyl ether, lauryl trimethyl ammonium chloride, stearyl trimethyl ammonium chloride, lauryl betaine, stearyl betaine, and the like can be mentioned. These antistatic agents may be used alone or may be combined.

The antistatic agent is preferably in the range of from 0.5 to 5.0 parts by weight with respect to 100 parts by weight of the composite polystyrene-based resin particles.

When the coating amount of the antistatic agent is small at less than 0.5 parts by weight, sufficient improvement in antistatic performance may not be obtained. On the other hand, if the coating amount of the antistatic agent exceeds 5.0 parts by weight, the fusion property of the expanded molded article may be damaged. A more preferable content is in the range of from 0.8 to 2.0 parts by weight, and an even more preferable content is in the range of from 0.9 to 1.5 parts by weight.

Specific amounts of the antistatic agents are 0.5, 0.8, 0.9, 1.0, 1.5, 2.0, 5.0 parts by weight, and the like with respect to 100 parts by weight of the composite polystyrene-based resin particles.

(Expandable Composite Polystyrene-Based Resin Particles)

The expandable composite polystyrene-based resin particles of the present invention include composite polystyrene-based resin particles and a volatile blowing agent, and can be produced by impregnating the volatile blowing agent after or during polymerization in the second polymerization step mentioned above.

Regarding the temperature for impregnating the volatile blowing agent, when low, time is required for impregnation and thus production efficiency of the expandable polystyrene-based resin particles may decrease. On the other hand, when the temperature is high, a large amount of cohesion between the expandable polystyrene-based resin particles occurs, and thus from 70 to 130° C. is preferable and from 80 to 120° C. is more preferable.

(Volatile Blowing Agent)

As the volatile blowing agent, there are no particular limitations as long as such has been conventionally used in the expansion of polystyrene-based resins. For example, volatile blowing agents such as aliphatic hydrocarbons having 10 or less carbons such as isobutane, n-butane, n-pentane, isopentane, neopentane, and cyclopentane can be mentioned. In particular, butane-based blowing agents and pentane-based blowing agents are preferable and volatile blowing agents having pentane as the main component (for example, 50% by weight or more) are particularly preferable. It can be also expected that pentane will act as a plasticizer.

The content of the volatile blowing agent in the expandable composite polystyrene-based resin particles is normally in the range of from 2 to 10% by weight, is preferably in the range of from 3 to 10% by weight, and is more preferably in the range of from 3 to 8% by weight.

When the content of the volatile blowing agent is low, for example, less than 2% by weight, obtaining low-density composite polystyrene-based resin expanded molded article from the expandable composite polystyrene-based resin particles may not be possible, and moreover, since an effect of increasing the secondary expansion force when expansion molding in the mold also cannot be achieved, the appearance of the composite polystyrene-based resin expanded molded article may deteriorate. On the other hand, when the content of the volatile blowing agent is high, for example exceeds 10% by weight, the time required for the cooling step in the production process of a composite polystyrene-based resin expanded molded article made of expanded composite polystyrene-based resin particles increases and thus productivity may decrease.

(Blowing Auxiliary Agent)

A blowing auxiliary agent may be included with the volatile blowing agent in the expanded composite polystyrene-based resin particles of the present invention.

As the blowing auxiliary agent, there are no particular limitations as long as such has been conventionally used in the expansion of polystyrene-based resins. For example, aromatic organic compounds such as styrene, toluene, ethylbenzene, and xylene; cyclic aliphatic hydrocarbons such as cyclohexane and methylcyclohexane; and solvents having a boiling point of 200° C. or less at 1 atm such as ethyl acetate and butyl acetate can be mentioned.

The content of the blowing auxiliary agent in the composite polystyrene-based resin particles is normally in the range of from 0.2 to 2.5% by weight and is preferably in the range of from 0.3 to 2% by weight.

When the content of the blowing auxiliary agent is low, for example, less than 0.2% by weight, the plasticization effect of the polystyrene-based resin may not be exhibited. On the other hand, when the content of the blowing auxiliary agent is high, for example, exceeds 2.5% by weight, the appearance may deteriorate by the occurrence of shrinkage and melting in the composite polystyrene-based resin expanded molded article obtained by expansion molding expandable composite polystyrene-based resin particles or the time required for the cooling step in the production process of the composite polystyrene-based resin expanded molded article made of expanded composite polystyrene-based resin particles may increase.

Subsequently, expanded composite polystyrene-based resin particles of the present invention can be obtained by pre-expanding expandable composite polystyrene-based resin particles impregnated with a volatile blowing agent to a given bulk density (for example, 0.015 to 0.1 g/cm$^3$) by a known method in the art.

In the pre-expansion, air may be simultaneously introduced with steam according to necessity when expanding.

The conditions of pre-expansion may be appropriately set by the used resin particles, desired physical properties, and the like. For example, the pressure is about from 0.01 to 0.04 MPa, more preferably from 0.01 to 0.03 MPa, and even more preferably from 0.015 to 0.02 MPa. Specifically, 0.01 MPa, 0.015 MPa, 0.02 MPa, 0.03 MPa, 0.04 MPa, and the like can be mentioned.

Also, the time is about from 30 to 240 seconds, more preferably from 60 to 180 seconds, and even more preferably from 90 to 150 seconds. Specifically, 30 seconds, 60 seconds, 90 seconds, 120 seconds, 150 seconds, 180 seconds, 240 seconds, and the like can be mentioned.

The expanded composite polystyrene-based resin particles of the present invention preferably have a bulk density of 0.015 g/cm$^3$ or more and 0.1 g/cm$^3$ or less.

If the bulk density of the expanded particles is within the above-mentioned range, a composite polystyrene-based resin expanded molded article with more superior mechanical strength, moldabilty, and impact resistance can be provided.

When the bulk density of the expanded particles is less than 0.015 g/cm$^3$, impact resistance of the expanded molded article may decrease. On the other hand, when the bulk density of the expanded particles exceeds 0.1 g/cm$^3$, the weight of the expanded molded article increases when used as a packaging material or a cushioning material and thus may become economically disadvantaged. A more preferable bulk density of the expanded particles is in the range of from 0.018 g/cm$^3$ or more and 0.05 g/cm$^3$ or less.

Specific bulk densities are, for example, 0.015, 0.018, 0.02, 0.03, 0.04, 0.05, 0.08, 0.1, and the like.

Accordingly, the expanded composite polystyrene-based resin particles of the present invention are preferably those in which expandable composite polystyrene-based resin particles containing 2 to 10% by weight of a volatile blowing agent having pentane as the main component with respect to the expandable composite polystyrene-resin based particles are pre-expanded.

(Composite Polystyrene-Based Resin Expanded Molded Article)

The composite polystyrene-based resin expanded molded article of the present invention can be obtained by treating expanded composite polystyrene-based resin particles of the present invention by a known method in the art and are preferably obtained by fusion integration of expanded composite polystyrene-based resin particles of the present invention in a molding die built into the molder. Specifically, by the expanded composite polystyrene-based resin particles of the present invention being filled into a die of an expansion molder and reheated, the expanded molded article can be obtained by thermally fusing expanded particles while expanding.

The conditions of expansion molding may be appropriately set by the used resin particles, desired physical properties, and the like. For example, the pressure is about from 0.06 to 0.10 MPa, more preferably from 0.07 to 0.09 MPa, and even more preferably from 0.075 to 0.08 MPa. Specifically, 0.06 MPa, 0.07 MPa, 0.075 MPa, 0.08 MPa, 0.09 MPa, 0.10 MPa, and the like can be mentioned.

Also, the heating time is about from 20 to 60 seconds, more preferably from 25 to 50 seconds, and even more preferably from 30 to 40 seconds. Specifically, 20 seconds, 25 seconds, 30 seconds, 40 seconds, 50 seconds, 60 seconds, and the like can be mentioned.

The composite polystyrene-based resin expanded molded article of the present invention preferably has a falling ball impact value by JIS K7211 of 11 cm or more, a bending fracture point displacement by JIS K7221-1 of 12 mm or more, and a cracking amount by JIS Z0235 of less than 50%.

The falling ball impact value, the bending fracture point displacement, and the cracking amount are more preferably 13 cm or more, 14 mm or more, and less than 45%, respectively.

The measurement methods thereof are explained in detail in Examples.

EXAMPLES

Although specific examples of the present invention are shown below by examples, the examples below are merely exemplifications of the present invention and thus the present invention is not limited to these examples. Also, unless otherwise specified, "parts" and "%" below are on a weight basis.

In the examples and the comparative examples below, the average particle size of composite polystyrene-based resin particles; the bulk density and the expansion ratio of expanded composite polystyrene-based resin particles; the aspect ratio of polyacrylic acid alkyl ester-based resin fine particles in the cell membrane cross-section of expanded particles; the molecular weight of expanded composite polystyrene-based resin particles; the aspect ratio of polyacrylic acid alkyl ester-based resin fine particles in the cell membrane cross-section, the molecular weight, the falling ball impact value, the bending fracture point displacement, the cracking amount, and the moldability of an expanded molded article having an expansion ratio of 50, were measured and evaluated by the following measurement methods and evaluation standards.

Also, the surface resistivity of the expanded molded article was measured and the antistatic property was evaluated by the following methods.

<Average Particle Diameter of Composite Polystyrene-Based Resin Particles>

Average particle diameter is the value represented by $D_{50}$.

Specifically, using a Ro-Tap sieve shaker (manufactured by Iida Seisakusho), about 50 g of a sample was classified over 10 minutes with a JIS-standard sieve having sieve openings of 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm, and 0.180 mm, and the weight of the sample on the mesh was measured. From the obtained result, a cumulative weight distribution curve was prepared and the particle diameter (median diameter) when the cumulative weight becomes 50% is the average particle diameter.

<Bulk Density and Expansion Ratio of Expanded Composite Polystyrene-Based Resin Particles>

The bulk density and the expansion ratio of expanded composite polystyrene-based resin particles were measured as follows.

A weight (a) of about 5 g of expanded particles was weighed to two decimal places. The obtained expanded particles were placed in a 500 cm$^3$ measuring cylinder having a minimum memory unit of 5 cm$^3$. Next, a pressing tool composed of a circular resin plate having a diameter slightly smaller than the diameter of the measuring cylinder and a bar-like resin plate having a width of about 1.5 cm and a length of about 30 cm fixed upright to the center of the circular resin plate was abutted against the opening of the measuring cylinder so as to read a volume (b) of the expanded particles.

From the obtained weight (a) of expanded particles and volume (b) of expanded particles, the following equations were determined.

Bulk density of expanded particles (g/cm$^3$)=(a)/(b)

Expansion ratio=inverse of bulk density=(b)/(a)

<Aspect Ratio of Polyacrylic Acid Alkyl Ester-Based Resin Fine Particles in Cell Membrane Cross-Section of Expanded Particles>

Expanded particles were sliced, and a piece was cut out from near the center of the expanded particles. Such piece was encapsulated within an epoxy resin, and the epoxy resin including the expanded particle piece was processed using an ultramicrotome (manufactured by Leica Microsystems GmbH, LEICA ULTRACUT UCT) to thereby produce an ultrathin piece. Ruthenium tetroxide was used as the staining agent.

Figure 2:
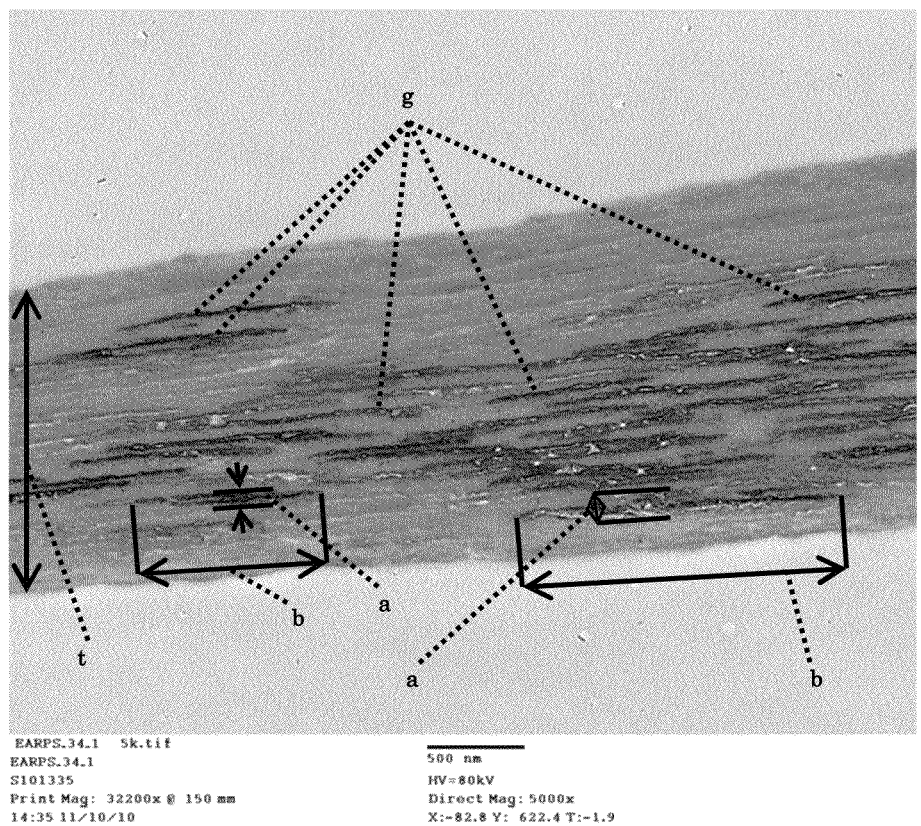
FIG. 2 is a transmission electron microscope (TEM) photograph for explaining the measurement method of the aspect ratio of the cell membrane cross-section of expanded particles.

Subsequently, photographs of the ultrathin piece were taken with a transmission electron microscope (manufactured by Hitachi High-Technologies Corporation, H-7600) at 5,000 times magnification (in some cases, 10,000 times magnification or 20,000 times magnification). The taken photographs were printed enlarged so as to become one image on an A4 sheet of paper. 30 particles in order from the longest polyacrylic acid alkyl ester-based resin fine particles for which both ends can be confirmed in a range of 150 mm×200 mm in the image were selected, the thickness a (dimension in the cell membrane thickness direction) and the length b (dimension in the cell membrane surface direction) of these particles were measured, and the aspect ratio (b/a) was calculated. Each is the dimension of the longest section. In other words, the length between both ends of particles that can be confirmed even when the particles are bent is b, and the length of the longest section in the perpendicular direction with a line connecting both ends of such particles is a. The total average aspect ratio is calculated from the obtained aspect ratios and is used as the aspect ratio of the polyacrylic acid alkyl ester-based resin fine particles in the expanded composite polystyrene-based resin particles (refer to FIG. 2).

<Aspect Ratio of Polyacrylic Acid Alkyl Ester-Based Resin Fine Particles in Cell Membrane Cross-Section of Expanded Molded Article>

The skin was removed from the expanded molded article and a piece was cut out from near the center of the surface from which this skin has been removed. Such piece was encapsulated within an epoxy resin, and the epoxy resin including said piece was processed using an ultramicrotome (manufactured by Leica Microsystems GmbH, LEICA ULTRACUT UCT) to thereby produce ultrathin pieces. Ruthenium tetroxide was used as the staining agent.

Subsequently, photographs of the ultrathin piece were taken with a transmission electron microscope (manufactured by Hitachi High-Technologies Corporation, H-7600) at 5,000 times magnification (in some cases, 10,000 times magnification or 20,000 times magnification). The taken photographs were printed enlarged so as to become one image on an A4 sheet of paper. 30 particles in order from the longest polyacrylic acid alkyl ester-based resin fine particles for which both ends can be confirmed in a range of 150 mm×200 mm in the image were selected, the thickness c (dimension in the cell membrane thickness direction) and the length d (dimension in the cell membrane surface direction) of these particles were measured, and the aspect ratio (d/c) was calculated. Each is the dimension of the longest section. In other words, the length between both ends of particles that can be confirmed even when the particles are bent is d and the length of the longest section in the perpendicular direction with a line connecting both ends of such particles is c. The total average aspect ratio is calculated from the obtained aspect ratios and is used as the aspect ratio of the polyacrylic acid alkyl ester-based resin fine particles in the composite polystyrene-based expanded molded article.

<Molecular Weight of Expanded Composite Polystyrene-Based Resin Particles>

Molecular weight means the polystyrene (PS)-converted average molecular weight measured using gel permeation chromatography (GPC) (internal standard method).

Expanded particles were divided in two so as to pass through the center thereof. 30 mg±3 mg of such expanded particles divided into two was dissolved in 4 mL of 0.1% by weight BHT (butylhydroxytoluene)-containing chloroform, the resultant solution was filtered with a non-aqueous-based 0.45 μm chromatodisc, and the obtained filtrate was measured using a chromatograph under the following conditions. The average molecular weight of the sample was determined from the calibration curve of standard polystyrene measured and created in advance.

Measurement device: Tosoh HPLC (Pump: DP-8020, Autosampler: AS-8020, Detectors: UV-8020 and RI-8020)

Column: GPC K-806L (φ8.0×300 mm, manufactured by Shodex)×2

Guard column: GPC K-LG (φ8.0×50 mm, manufactured by Shodex)×1

Number of tests: 2

Measurement conditions: column temperature (40° C.), mobile phase (chloroform), mobile phase flow rate (1.2 mL/min), pump temperature (room temperature), detector temperature (room temperature), measurement time (25 minutes), detection wavelength (UV 254 nm), injection amount (50 μL)

Standard polystyrene for calibration curves: manufactured by Showa Denko K. K., Product name: "Shodex", weight-average molecular weight (Mw): 5,620,000, 3,120,000, 1,250,000, 442,000, 131,000, 54,000, 20,000, 7,590, 3,450, and 1,320

From the obtained weight-average molecular weight Mw and the Z-average molecular weight Mz was determined the ratio Mz/Mw thereof.

<Molecular Weight of Composite Polystyrene-Based Resin Expanded Molded Article>

Molecular weight means the polystyrene (PS)-converted average molecular weight measured using gel permeation chromatography (GPC) (internal standard method).

A 30 mg±3 mg sample was taken from the expanded molded article and this sample was dissolved in 4 mL of 0.1% by weight BHT (butylhydroxytoluene)-containing chloroform, the resultant solution was filtered with a non-aqueous-based 0.45 μm chromatodisc, and the obtained filtrate was measured using a chromatograph under the following conditions. The average molecular weight of the sample was determined from the calibration curve of standard polystyrene measured and created in advance.

Measurement device: Tosoh HPLC (Pump: DP-8020, Autosampler: AS-8020, Detectors: UV-8020 and RI-8020)

Column: GPC K-806L (φ8.0×300 mm, manufactured by Shodex)×2

Guard column: GPC K-LG (φ8.0×50 mm, manufactured by Shodex)×1

Number of tests: 2

Measurement conditions: column temperature (40° C.), mobile phase (chloroform), mobile phase flow rate (1.2 mL/min), pump temperature (room temperature), detector temperature (room temperature), measurement time (25 minutes), detection wavelength (UV 254 nm), injection amount (50 μL)

Standard polystyrene for calibration curves: manufactured by Showa Denko K. K., Product name: "Shodex", weight-average molecular weight (Mw): 5,620,000, 3,120,000, 1,250,000, 442,000, 131,000, 54,000, 20,000, 7,590, 3,450, and 1,320

From the obtained weight-average molecular weight Mw and the Z-average molecular weight Mz was determined the ratio Mz/Mw thereof.

<Falling Ball Impact Value of Expanded Molded Article>

The falling ball impact strength was measured in accordance with JIS K7211: 1976 "General Principles of Falling Weight Impact Test Method for Rigid Plastic".

After the obtained expanded molded article having an expansion ratio of 50 was dried at a temperature of 50° C. for 1 day, a test piece (6 surfaces having no skin) of 40 mm×215 mm×20 mm (thickness) was cut from this expanded molded article.

Subsequently, both ends of the test piece were fixed using clamps so that the space between fulcrums is 150 mm, a steel ball weighing 321 g was made to fall from a predetermined height onto the center portion of the test piece, and the presence/absence of breakage of the test piece was observed.

The test was conducted with the rigid ball falling height (test height) being changed at intervals of 5 cm from the minimum height for all of the 5 test pieces to be broken to the maximum height for none of the test pieces to be broken, and the falling ball impact value (cm), in other words, the 50% breaking height, was calculated from the following calculation formula.

$$H_{50}=H_i+d[\Sigma(i \cdot n_i)/N \pm 0.5]$$

The symbols in the formula mean the following.
$H_{50}$: 50% breaking height (cm)
$H_i$: Test height (cm) when the height level (i) is 0 and the height from which the test piece is expected to be broken
d: Height interval (cm) when the test height is elevated or lowered
i: Height level which increases or decreases one by one (i=−3, −2, −1, 0, 1, 2, 3 . . . ) with the height level at Hi being 0
$n_i$: Number of test pieces broken (or not broken) at each level, for which data of the greater number is used (if the numbers are the same, either may be used)
N: Total number ($N=\Sigma n_i$) of test pieces broken (or not broken) at each level, for which data of the greater number is used (if the numbers are the same, either may be used)
±0.5: A negative number is employed when data of broken test pieces is used and a positive number is employed when data of not-broken test pieces is used.

The obtained falling ball impact value was evaluated by the following standard. A larger falling ball impact value shows larger impact resistance of the expanded molded article.
  ⊖ (superior): Falling ball impact value of 13 cm or more
  ○ (good): Falling ball impact value in the range of 11 cm or more and less than 13 cm
  Δ (possible): Falling ball impact value in the range of 9 cm or more and less than 11 cm
  x (not possible): Falling ball impact value of less than 9 cm <Bending Fracture Point Displacement of Expanded Molded Article>

The bending strength was measured in accordance with the method described in JIS K7221-1: 2006 "Rigid Expanded Polystyrene-Bending Test-Section 1: Bending Test".

After the obtained expanded molded article having an expansion ratio of 50 was dried at a temperature of 50° C. for 1 day, a test piece of 25 mm×130 mm×20 mm (thickness) was cut from this expanded molded article.

Subsequently, a pressing wedge 5R and a support base 5R were mounted on a universal tester (manufactured by Orientech Co., Ltd., Tension® UCT-10T) as distal end jigs, and a test piece was set at distance of 100 mm between fulcrums and a bend test was carried out under the conditions of a compression rate of 10 mm/min. In this test, the fracture detection sensitivity was set at 0.5% and when the decrease thereof exceeds a set value 0.5% compared to a directly-before load sampling point, the directly-before sampling point is measured as the bending fracture point displacement (mm).

The obtained bending fracture point displacement was evaluated by the following standard. A larger bending fracture point displacement shows larger resilience of the expanded molded article.
  ⊖ (superior): Bending fracture point displacement of 14 mm or more
  ○ (good): Bending fracture point displacement in the range of 12 mm or more and less than 14 mm
  Δ (possible): Bending fracture point displacement in the range of 10 mm or more and less than 12 mm
  x (not possible): Bending fracture point displacement of less than 10 mm <Cracking Amount of Expanded Molded Article>

The cracking amount was measured in accordance with the method described in JIS Z0235: 1976 "Cushioning Materials for Packaging-Evaluation Test Method".

After the obtained expanded molded article having an expansion ratio of 50 was dried at a temperature of 50° C. for 1 day, a sample piece of 75 mm×300 mm×50 mm (thickness) was cut from this expanded molded article.

Figure 3:
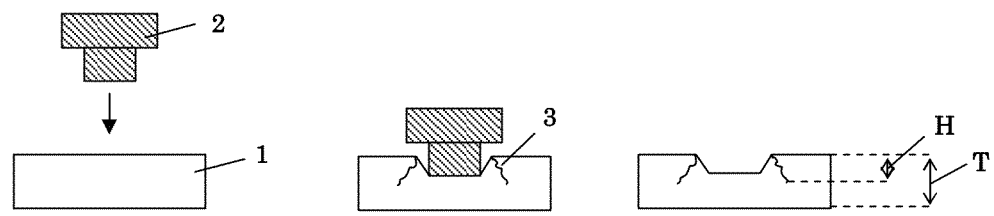
FIG. 3 is a schematic drawing for explaining the measurement method of the cracking amount of the expanded molded article.

Subsequently, the sample piece was lightly fixed on the center of the base of a drop impact test machine for cushioning materials (manufactured by Yoshida Seiki, CST-320S) so as not to move when impacted. As shown in FIG. 3, a weight of 13.5 kg was dropped from a height of 60 cm so as to impact roughly on the central portion in the length direction of the sample piece and go over the entire surface in the width direction. Cracks generated in the sample piece at this time were observed and the cracking amount (%) was calculated by the following calculation formula.

$$S=H/T \times 100$$

The symbols in the formula mean the following.
S: Cracking amount (%)
H: Crack dimensions (mm)
T: Thickness of test piece (mm)

The obtained cracking amount was evaluated by the following standard. A smaller the cracking amount shows larger impact resistance of the expanded molded article.
  ⊖ (superior): Cracking amount of less than 45%
  ○ (good): Cracking amount in the range of 45% or more and less than 50%
  Δ (possible): Cracking amount in the range of 50% or more and less than 55%
  x (not possible): Cracking amount of 55% or more <Moldabilty of Expanded Molded Article>

After pre-expansion, expanded particles having an expansion ratio of 50 that were matured for 24 hours at normal temperature were filled into the cavity of an expanded bead automatic molder (manufactured by Sekisui Machinery Co., Ltd., ACE-3SP) equipped with a mold die having a cuboid-shaped cavity with internal dimensions of 300 mm×400 mm×50 mm (thickness), and after steam heating and cooling under the following conditions, an expanded molded article was extracted from the die, and the appearance of the expanded molded article was evaluated.
  (Molding Conditions) Mold heating: 5 seconds
  One-side heating: 10 seconds
  Reverse one-side heating: 5 seconds
  Both-side heating: 20 seconds
  Water cooling: 10 seconds
  Steam pressure setting: 0.06, 0.07, and 0.08 MPa
  ⊖ (superior): The molded article surface has sufficient extension and there are no expanded particles in which the surface has melted (The appearance of the molded article is very good with no voids between expanded particles and a very smooth molded article surface)

○ (good): The appearance of the molded article is good with very few voids between the expanded particles and an almost smooth molded article surface Δ (possible): The molded article appearance is inferior in that extension of the molded article surface is insufficient or expanded particles in which the surface has melted exist and there are many voids in the molded article surface (no influence on impact resistance)

× (not possible): The molded article surface did not extend or the molded article shrunk to the extent that impact resistance is influenced or impact resistance evaluation is difficult <Antistatic Property>

The surface resistivity was measured according to the method described in JIS K6911: 1995 "General Test Methods for Thermosetting Plastics".

After the obtained expanded molded article having an expansion ratio of 50 was dried at a temperature of 50° C. for 1 day, 10 sample pieces of 100 mm×100 mm×original thickness (10 mm or less) were cut out from the same expanded molded article.

Subsequently, using a digital ultra-high resistance/micro current meter and a resistivity chamber (manufactured by Advantest Corporation, R8340 and R12702A), electrodes were pressed into contact with a sample piece under a load of approximately 30 N and the resistance value of the sample piece was measured after charging by the application of 500 V for 1 minute. The surface resistivity was calculated from the following calculation formula:

$$\rho_s = \pi(D+d)/(D-d) \times R_s$$

The symbols in the formula mean the following.
$\rho_s$: Surface resistivity (MΩ)
D: Inner diameter of ring electrode on surface (cm)
d: Outer diameter of inner circle of surface electrode (cm)
$R_s$: Surface resistance (MΩ)

The obtained surface resistivity (average value of 10 sample pieces) was evaluated by the following standard.

○ (has an antistatic property): Surface resistivity ratio is $1 \times 10^{12}$ Ω or less × (does not have an antistatic property): Surface resistivity exceeds $1 \times 10^{12}$ Ω

Example 1

Production of Seed (Core PS) Particles 40 kg of water, 100 g of tribasic calcium phosphate as a suspension stabilizer, and 2.0 g of sodium dodecylbenzene sulfonate as an anionic surfactant were supplied to an autoclave having an internal volume of 100 liters and equipped with a stirrer. After adding 40 kg of styrene monomer, and 96.0 g of benzoyl peroxide and 28.0 g of t-butyl peroxybenzoate as polymerization initiators thereto while stirring, the resultant mixture was polymerized by raising the temperature to 90° C. Then, the reaction was maintained at this temperature for 6 hours and then further raised to 125° C. After 2 hours, the reaction was cooled to obtain polystyrene-based resin seed particles (A).

The above-mentioned polystyrene-based resin seed particles (A) were sieved, and polystyrene-based resin seed particles (B-1) having a particle diameter of from 0.5 to 0.71 mm (average particle diameter $D_{50}$=0.66 mm) and polystyrene-based resin seed particles (B-2) having a particle diameter of from 0.71 to 1.18 mm (average particle diameter $D_{50}$=0.99 mm) were obtained.

(Production of Composite Polystyrene-Based Resin Particles)

Next, 2,000 g of water, 500 g of the above-mentioned polystyrene-based resin seed particles (B-1), 10.0 g of magnesium pyrophosphate as a suspension stabilizer, and 0.4 g of sodium dodecylbenzene sulfonate as an anionic surfactant were supplied to an autoclave having an internal volume of 5 liters and equipped with a stirrer, and the temperature was raised to 75° C. while stirring.

Next, after 200 g of butyl acrylate having dissolved therein 0.6 g of dicumyl peroxide as a polymerization initiator was supplied to the above-mentioned 5-liter autoclave, butyl acrylate was absorbed into the seed particles. After maintaining such at 75° C. for 60 minutes, the temperatures was raised to 130° C. and maintained thereat for 2 hours.

Subsequently, after the temperature was lowered to 75° C. and then 200 g of styrene monomer having dissolved therein 5.2 g of benzoyl peroxide and 0.75 g of t-butyl peroxybenzoate as polymerization initiators was supplied to the above-mentioned 5-liter autoclave, the styrene monomer was absorbed into the seed particles and such was maintained at 75° C. for 60 minutes.

Then, the temperature of the reaction solution was raised from 75° C. to 120° C. over 180 minutes, and 1,100 g of styrene monomer was supplied in increments to the autoclave over 160 minutes from 75° C. to 115° C. Then, after the temperature was raised to 120° C., the temperature was further raised to 140° C., and the reaction was then cooled after 2 hours to obtain composite polystyrene-based resin particles (C).

(Production of Expandable Composite Polystyrene-Based Resin Particles)

Subsequently, 2,200 g of water, 1,800 g of the composite polystyrene-based resin particles (C), 7.2 g of magnesium pyrophosphate as a suspension stabilizer, and 0.36 g of sodium dodecylbenzene sulfonate were supplied to an autoclave having an internal volume of 5 liters and equipped with a stirrer, and the temperature was raised to 100° C. while stirring. Next, as a blowing agent, 144 g of pentane in which n-pentane/isopentane=75/25 to 85/15 (gas type a: Cosmo Oil Co., Ltd, product name: Pentane) was injected into the above-mentioned 5-liter autoclave and after maintaining as such for 3 hours, the reaction was cooled until 30° C. or less and removed from the autoclave. Then, that removed from the autoclave was dried and left for 7 days in a constant temperature room at 13° C. to obtain expandable composite polystyrene-based resin particles.

(Production of Expanded Composite Polystyrene-Based Resin Particles)

Subsequently, 1,500 g of the expandable composite polystyrene-based resin particles were coating-treated with a surface-treating agent comprising 1.2 g of zinc stearate, 1.2 g of triglyceride hydroxystearate, and 0.75 g of polyethylene glycol (Mw=300). After treatment, the expandable composite polystyrene-based resin particles were charged into a normal pressure pre-expanding machine pre-heated by steam and, while stirring, steam was introduced at a setting of about 0.03 MPa to pre-expand the expandable composite polystyrene-based resin particles for about 2 to 3 minutes until an expansion ratio of 50.

(Production of Expanded Molded Article)

After pre-expansion, expanded composite polystyrene-based resin particles having an expansion ratio of 50 that were matured for 24 hours at normal temperature were filled into the cavity of an expanded bead automatic molder (manufactured by Sekisui Machinery Co., Ltd., ACE-3SP) equipped with a mold die having a cuboid-shaped cavity with internal dimensions of 300 mm×400 mm×50 mm (thickness), and after steam heating and cooling under the following conditions, an expanded molded article was extracted from the die to obtain the expanded molded article.

(Molding Conditions) Mold heating: 5 seconds
One-side heating: 10 seconds
Reverse one-side heating: 5 seconds
Both-side heating: 20 seconds
Water cooling: 10 seconds
Steam pressure setting: 0.06, 0.07, and 0.08 MPa The obtained composite polystyrene-based resin particles, the expanded composite polystyrene-based resin particles, and the expanded molded article were measured and evaluated by the above-mentioned methods. The results thereof are shown in Tables 1 and 2.

Figure 1B:
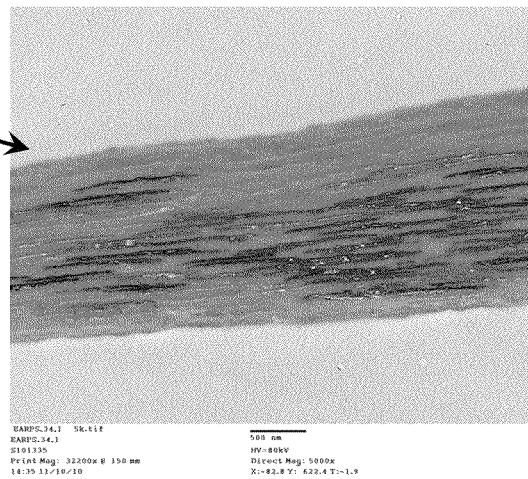

Also, in FIG. 1, a scanning electron microscope (SEM) photograph of the cross-section of the expanded composite polystyrene-based resin particles (a) and a transmission electron microscope (TEM) photograph of the internal cell membrane (b) are shown.

Example 2

Other than using 2-ethylhexyl acrylate instead of butyl acrylate in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 3

Other than using ethyl acrylate instead of butyl acrylate in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 4

Production of Composite Polystyrene-Based Resin Particles 2,000 g of water, 600 g of the above-mentioned polystyrene-based resin seed particles (B-1), 10.0 g of magnesium pyrophosphate as a suspension stabilizer, and 0.4 g of sodium dodecylbenzene sulfonate as an anionic surfactant were supplied to an autoclave having an internal volume of 5 liters and equipped with a stirrer, and the temperature was raised to 75° C. while stirring.

Next, after 400 g of butyl acrylate having dissolved therein 1.2 g of dicumyl peroxide as a polymerization initiator was supplied to the above-mentioned 5-liter autoclave, butyl acrylate was absorbed into the seed particles. After maintaining such at 75° C. for 60 minutes, the temperature was raised to 130° C. and maintained thereat for 2 hours.

Subsequently, after the temperature was lowered to 75° C. and then 200 g of styrene monomer having dissolved therein 4.0 g of benzoyl peroxide and 0.7 g of t-butyl peroxybenzoate as polymerization initiators was supplied to the above-mentioned 5-liter autoclave, the styrene monomer was absorbed into the seed particles and such was maintained at 75° C. for 60 minutes.

Then, the temperature of the reaction solution was raised from 75° C. to 120° C. over 180 minutes, and 800 g of styrene monomer was supplied in increments to the autoclave over 160 minutes from 75° C. to 115° C. After the temperature was raised to 120° C., the temperature was further raised to 140° C., and the reaction was then cooled after 2 hours to obtain composite polystyrene-based resin particles (C).

Then, using the obtained composite polystyrene-based resin particles (C), expandable composite polystyrene-based resin particles, expanded composite polystyrene-based resin particles, and an expanded molded article were obtained, and measured and evaluated in the same manner as Example 1. The results thereof are shown in Tables 1 and 2.

Example 5

Other than using the above-mentioned polystyrene-based resin seed particles (B-2) instead of the above-mentioned polystyrene-based resin seed particles (B-1) and changing the 4.0 g of benzoyl peroxide to 3.0 g in the production of composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 4. The results thereof are shown in Tables 1 and 2.

Example 6

Other than changing the 5.2 g of benzoyl peroxide to 6.5 g in the production of composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 7

Other than supplying to the 5-liter autoclave 200 g of butyl acrylate having dissolved therein 0.2 g of divinyl benzene in addition to 0.6 g of dicumyl peroxide as polymerization initiators and changing the 5.2 g of benzoyl peroxide to 7.15 g in the production of composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 8

Other than changing the 5.2 g of benzoyl peroxide to 2.6 g in the production of composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 9

Other than using butane in which n-butane/i-butane=60/40 to 70/30 (gas type b: Cosmo Oil Co., Ltd, product name:

Cosmo Butane Silver) instead of pentane in which n-pentane/isopentane=75/25 to 85/15 (gas type a: Cosmo Oil Co., Ltd, product name: Pentane) in the production of the expandable composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 10

Other than supplying to the 5-liter autoclave 400 g of butyl acrylate having dissolved therein 1.0 g of divinyl benzene in addition to 1.2 g of dicumyl peroxide as polymerization initiators in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 4. The results thereof are shown in Tables 1 and 2.

Example 11

Other than using 6.5 g of t-butylperoxy-2-ethylhexanoate instead of 5.2 g of benzoyl peroxide in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Example 12

Other than changing the 5.2 g of benzoyl peroxide to 9.1 g in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 1. The results thereof are shown in Tables 1 and 2.

Comparative Example 1

Production of Polystyrene-Based Resin Particles 2,000 g of water, 500 g of the above-mentioned polystyrene-based resin seed particles (B-1), 8.0 g of magnesium pyrophosphate as a suspension stabilizer, and 0.4 g of sodium dodecylbenzene sulfonate as an anionic surfactant were supplied to an autoclave having an internal volume of 5 liters and equipped with a stirrer, and the temperature was raised to 75° C. while stirring.

Next, after 100 g of styrene monomer having dissolved therein 6.0 g of benzoyl peroxide and 0.75 g of t-butyl peroxybenzoate as polymerization initiators was supplied to the above-mentioned 5-liter autoclave, the styrene monomer was absorbed into the seed particles and such was maintained at 75° C. for 30 minutes.

Subsequently, the temperature of the reaction solution was raised from 75° C. to 120° C. over 180 minutes and 1,400 g of styrene monomer was supplied in increments to the autoclave over 160 minutes from 75° C. to 115° C. Then, after the temperature was raised to 120° C., the temperature was further raised to 130° C., and the reaction was then cooled after 2 hours to obtain polystyrene-based resin particles (C).

(Production of Expandable Polystyrene-Based Resin Particles)

Subsequently, 2,200 g of water, 1,800 g of the polystyrene-based resin particles (C), 7.2 g of magnesium pyrophosphate as a suspension stabilizer, and 0.36 g of sodium dodecylbenzene sulfonate were supplied to an autoclave having an internal volume of 5 liters and equipped with a stirrer, and the temperature was raised to 100° C. while stirring. Next, as a blowing agent, 126 g of butane in which n-butane/i-butane=60/40 to 70/30 (gas type b: Cosmo Oil Co., Ltd, product name: Cosmo Butane Silver) was injected into the above-mentioned 5-liter autoclave and after maintaining as such for 3 hours, the reaction was cooled until 30° C. or less and removed from the autoclave. Next, that removed from the autoclave was dried and left for 7 days in a constant temperature room at 13° C. to obtain expandable composite polystyrene-based resin particles.

The production of expanded polystyrene-based resin particles and the expanded molded article were carried out in accordance with the production of the expanded composite polystyrene-based resin particles and the expanded molded article in Example 1, and an expanded molded article was obtained, and measured and evaluated. The results thereof are shown in Tables 1 and 2.

Comparative Example 2

Production of Rubber-Modified Polystyrene-Based Resin Particles

A styrene-butadiene block copolymer in which the butadiene component is 60% by weight was dissolved in styrene monomer to make a 14.5% by weight solution. To 100 parts by weight of this solution, 5 parts by weight of ethyl benzene, 0.05 parts by weight of 1,1-bis(t-butylperoxy)cyclohexane, and 0.05 parts by weight of t-dodecyl mercaptan were added to obtain a polymer raw material solution.

Subsequently, the obtained polymer raw material solution was supplied to an autoclave having an internal volume of 5 liters and equipped with a stirrer and polymerization was carried out under the following conditions. After maintaining at a polymerization temperature of 105° C. for 3 hours, raising the temperature to 130° C. and maintaining thereat for 2 hours, and further raising the temperature to 145° C. and maintaining thereat for 1 hour so as to polymerize, the obtained polymer solution was sent to a devolatization device under vacuum heating and the unreacted styrene monomer and ethyl benzene were removed to obtain a polymer.

The obtained polymer was supplied to an extruder, kneaded, extracted as strands from holes of a die, and after directly being water-cooled, cut into pellets having a diameter of about 1 mm and a length of about 1.5 mm. The content of the butadiene component in the obtained pellet-shaped rubber-modified polystyrene-based resin particles, when calculated from the mass balance of the styrene-butadiene block copolymer and the styrene, was 10.5% by weight.

(Production of Expandable Rubber-Modified Polystyrene-Based Resin Particles)

Subsequently, 2,200 g of water, 1,800 g of the rubber-modified polystyrene-based resin particles, 7.2 g of magnesium pyrophosphate as a suspension stabilizer, and 0.36 g of sodium dodecylbenzene sulfonate were supplied to a different autoclave having an internal volume of 5 liters and equipped with a stirrer, and the temperature was raised to 125° C. while stirring. Next, as a blowing agent, 144 g of pentane in which n-pentane/isopentane=75/25 to 85/15 (gas type a: Cosmo Oil Co., Ltd, product name: Pentane) was injected into the above-mentioned 5-liter autoclave and maintained as such for 5 hours to obtain expandable rubber-modified polystyrene-based resin particles. After maintaining as such, the rubber-modified polystyrene-based resin particles on being cooled until 30° C. or less were removed from the autoclave and after being dried, were left for 5 days in a constant temperature room at 13° C.

(Production of Expanded Rubber-Modified Polystyrene-Based Resin Particles and Expanded Molded Article)

The production of the expanded rubber-modified polystyrene-based resin particles and the expanded molded article were carried out in accordance with the production of the expanded composite polystyrene-based resin particles and the expanded molded article in Example 1, and an expanded molded article was obtained, and measured and evaluated. The results thereof are shown in Tables 1 and 2.

TABLE 1

|  | Composite PS-Based Resin Particles | | | | Expandable Composite PS-Based Resin Particles | | Expanded Composite PS-Based Resin Particles Evaluation | | | |
|---|---|---|---|---|---|---|---|---|---|---|
|  | Core PS | AE | Core PS/AE/SM (weight ratio) | Average Particle Diameter (mm) | Loaded Gas Type | Added Amount (wt %/resin particles) | Bulk Density (g/cm³) | Aspect Ratio b/a | Mw × 10⁴ | Mz/Mw |
| Example 1 | B-1 | Ab | 25/10/65 | 1.04 | a | 8 | 0.02 | 40.1 | 26.4 | 2.56 |
| Example 2 | B-1 | Aeh | 25/10/65 | 1.04 | a | 8 | 0.02 | 38.3 | 26.7 | 2.59 |
| Example 3 | B-1 | Ae | 25/10/65 | 1.03 | a | 8 | 0.02 | 37.8 | 26.1 | 2.52 |
| Example 4 | B-1 | Ab | 30/20/50 | 0.93 | a | 8 | 0.02 | 36.5 | 26.3 | 2.54 |
| Example 5 | B-2 | Ab | 30/20/50 | 1.54 | a | 8 | 0.02 | 45.3 | 29.4 | 2.68 |
| Example 6 | B-1 | Ab | 25/10/65 | 1.04 | a | 8 | 0.02 | 29.6 | 23.6 | 2.28 |
| Example 7 | B-1 | Ab | 25/10/65 | 1.04 | a | 8 | 0.02 | 14.7 | 21.3 | 2.17 |
| Example 8 | B-1 | Ab | 25/10/65 | 1.04 | a | 8 | 0.02 | 58.4 | 33.6 | 3.15 |
| Example 9 | B-1 | Ab | 25/10/65 | 1.04 | b | 8 | 0.02 | 39.1 | 26.5 | 2.55 |
| Example 10 | B-2 | Ab | 30/20/50 | 0.92 | a | 8 | 0.02 | 7.5 | 25.9 | 2.61 |
| Example 11 | B-2 | Ab | 25/10/65 | 1.03 | a | 8 | 0.02 | 67.5 | 30.2 | 1.94 |
| Example 12 | B-1 | Ab | 25/10/65 | 1.03 | a | 8 | 0.02 | 15.3 | 18.7 | 2.21 |
| Comparative Example 1 | B-1 | — | 25/0/75 | 1.08 | b | 7 | 0.02 | — | 28.3 | 2.83 |
| Comparative Example 2 | PB/PS = 10.5/89.5 | | | 1.10 | a | 8 | 0.02 | 4.3 | 25.7 | 2.19 |

Core PS: Polystyrene-based resin seed particles
AE: Acrylic acid ester
SM: Styrene monomer (corresponds to polystyrene)
Ab: Butyl acrylate
Aeh: 2-ethylhexyl acrylate
Ae: Ethyl acrylate
Mw: Weight-average molecular weight
Mz: Z-average molecular weight
PB/PS: Polybutadiene component/polystyrene component

TABLE 2

| | Evaluation of Composite PS-Based Resin Expanded Molded Article | | | | | | | | | |
|---|---|---|---|---|---|---|---|---|---|---|
| | Bulk Density (g/cm³) | Aspect Ratio d/c | Mw × 10⁴ | Mz/Mw | Falling Ball Impact Value (cm) | Bending Fracture Point Displacement (mm) | Cracking Amount (%) | Moldability Steam Pressure Setting 0.06 MPa | 0.07 MPa | 0.08 MPa |
| Example 1 | 0.02 | 41.1 | 26.7 | 2.53 | 16.5 (Θ) | 15.8 (Θ) | 42.2 (Θ) | Θ | Θ | Θ |
| Example 2 | 0.02 | 39.1 | 26.5 | 2.61 | 16.5 (Θ) | 16.3 (Θ) | 41.7 (Θ) | Θ | Θ | Θ |
| Example 3 | 0.02 | 38.3 | 26.3 | 2.49 | 14.5 (Θ) | 14.5 (Θ) | 43.3 (Θ) | Θ | Θ | Θ |
| Example 4 | 0.02 | 37.3 | 26.6 | 2.51 | 15.5 (Θ) | 15.1 (Θ) | 42.5 (Θ) | Θ | Θ | Θ |
| Example 5 | 0.02 | 46.9 | 29.7 | 2.65 | 17.5 (Θ) | 17.3 (Θ) | 40.8 (Θ) | Θ | Θ | Θ |
| Example 6 | 0.02 | 30.3 | 23.4 | 2.31 | 14.5 (Θ) | 14.6 (Θ) | 43.5 (Θ) | Θ | Θ | Θ |
| Example 7 | 0.02 | 15.3 | 21.1 | 2.13 | 12.5 (○) | 13.5 (○) | 45.8 (○) | Θ | Θ | Θ |
| Example 8 | 0.02 | 59.3 | 33.8 | 3.19 | 15.5 (Θ) | 15.3 (Θ) | 41.9 (Θ) | ○ | Θ | Θ |
| Example 9 | 0.02 | 40.5 | 26.9 | 2.53 | 12.5 (○) | 13.8 (○) | 45.3 (○) | Θ | Θ | Θ |
| Example 10 | 0.02 | 8.1 | 25.5 | 2.63 | 9.5 (Δ) | 10.8 (Δ) | 52.3 (Δ) | ○ | ○ | ○ |
| Example 11 | 0.02 | 68.1 | 39.5 | 1.93 | 10.5 (Δ) | 11.3 (Δ) | 50.8 (Δ) | X | Δ | ○ |
| Example 12 | 0.02 | 16.1 | 18.3 | 2.23 | 10.3 (Δ) | 10.9 (Δ) | 51.8 (Δ) | ○ | ○ | Δ |
| Comparative Example 1 | 0.02 | — | 26.7 | 2.85 | 7.5 (X) | 8.6 (X) | 55.8 (X) | Θ | Θ | Θ |
| Comparative Example 2 | 0.02 | 5.5 | 25.3 | 2.21 | 8.5 (X) | 9.8 (X) | 55.3 (X) | ○ | ○ | Δ |

Example 13

Production of Composite Polystyrene-Based Resin Particles 2,000 g of water, 500 g of the polystyrene-based resin particles (B-1) obtained in Example 1 as seed particles, 10.0 g of magnesium pyrophosphate as a suspension stabilizer, and 1.6 g of sodium dodecylbenzene sulfonate as an anionic surfactant were supplied to an autoclave having an internal volume of 5 liters and equipped with a stirrer, and the temperature was raised to 75° C. while stirring.

Next, after 200 g of butyl acrylate having dissolved therein 0.6 g of dicumyl peroxide and 10 g of a polybutadiene-terminated acrylate (manufactured by Osaka Organic Chemical Industry Ltd., product name: BAC-45) as polymerization initiators was supplied to the above-mentioned 5-liter autoclave, butyl acrylate was absorbed into the seed particles, this was maintained at 75° C. for 60 minutes, and the temperature was raised to 130° C. and maintained thereat for 2 hours.

Thereafter, the mixture was cooled to 75° C., and after 200 g of styrene monomer having dissolved therein 7.0 g of benzoyl peroxide and 0.75 g of t-butylperoxy benzoate as polymerization initiators was supplied to the above-mentioned 5-liter autoclave, the styrene monomer was absorbed into the seed particles, and this was maintained at 75° C. for 60 minutes so as to polymerize to obtain a reaction solution.

Next, the temperature of the reaction solution was raised from 75° C. to 120° C. over 180 minutes, and 1,100 g of styrene monomer was supplied in increments to the autoclave over 160 minutes. Then, after the temperature was raised to 120° C., the temperature was further raised to 140° C., and the reaction was then cooled after 2 hours to obtain composite polystyrene-based resin particles (C).

(Production of Expandable Composite Polystyrene-Based Resin Particles)

Subsequently, 2,200 g of water, 1,800 g of the composite polystyrene-based resin particles (C), 7.2 g of magnesium pyrophosphate as a suspension stabilizer, and 1.44 g of sodium dodecylbenzene sulfonate were supplied to a different autoclave having an internal volume of 5 liters and equipped with a stirrer, and the temperature was raised to 125° C. while stirring. Next, as a blowing agent, 144 g of pentane in which n-pentane/isopentane=75/25 to 85/15 (gas type a: Cosmo Oil Co., Ltd, product name: Pentane) was injected into the above-mentioned 5-liter autoclave and after maintaining as such for 3 hours, the reaction was cooled until 30° C. or less and removed from the autoclave. Next, that removed from the autoclave was dried and left for 5 days in a constant temperature room at 13° C. to obtain expandable composite polystyrene-based resin particles.

(Production of Expanded Composite Polystyrene-Based Resin Particles and Expanded Molded Article)

Pre-expanded resin particles and an expanded molded article were obtained from the obtained expandable particles, and measured and evaluated in the same manner as Example 1. The results thereof are shown in Tables 3 and 4.

Example 14

Other than the 10 g of polybutadiene-terminated acrylate being 16 g in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 13. The results thereof are shown in Tables 3 and 4.

Example 15

Other than the 10 g of polybutadiene-terminated acrylate being 20 g in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 13. The results thereof are shown in Tables 3 and 4.

Example 16

Other than the 10 g of polybutadiene-terminated acrylate being 40 g in the production of the composite polystyrene-based resin particles, composite polystyrene-based resin particles, expandable composite polystyrene-based resin particles, expanded composite polystyrene-based resin particles, and an expanded molded article were obtained, and measured and evaluated in the same manner as Example 13. The results thereof are shown in Tables 3 and 4.

Example 17

Coating of Expandable Particles 1,500 g of the above-mentioned expandable composite polystyrene-based resin particles were charged into a tumbler mixer having an internal volume of 20 L. Subsequently, 1.2 g of zinc stearate, 1.2 g of triglyceride hydroxystearate, 0.75 g of glycerin monostearate, and 15.0 g of polyoxyethylene hydroxyalkylamine (manufactured by Tanaka Chemical Corporation, product name: Antista-80FS) as an antistatic agent were sequentially charged and stirred for 15 minutes. Next, 0.75 g of polyethylene glycol (Mw=300) and 0.45 g of diisobutyl adipate were charged and stirred for 15 minutes to cover the surface of the expandable polystyrene-based resin particles with the above-mentioned surface treatment agent.

Other than that above, composite polystyrene-based resin particles, expandable composite polystyrene-based resin particles, expanded composite polystyrene-based resin particles, and an expanded molded article were obtained, and measured and evaluated in the same manner as Example 13. The results thereof are shown in Tables 3 and 4.

Figure 4:
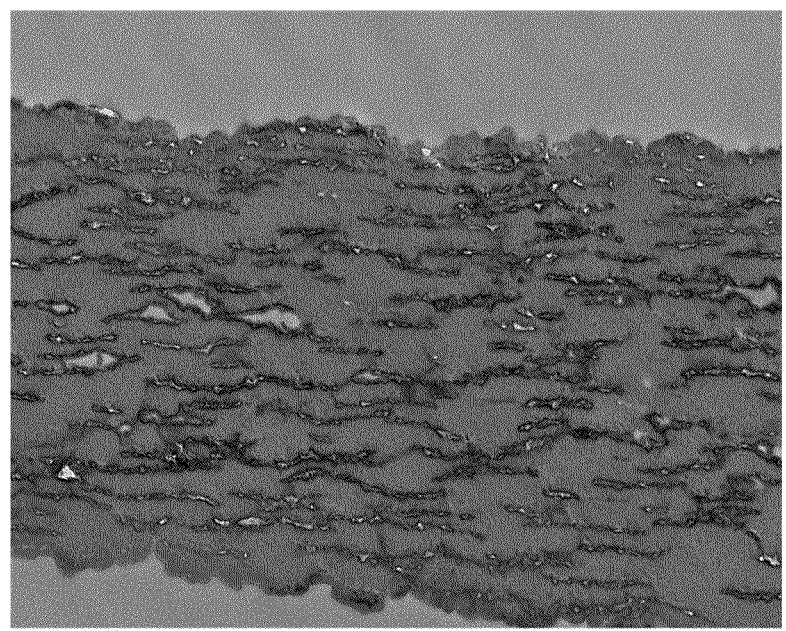
FIG. 4 is a scanning electron microscope (SEM) photograph of the cross-section of the expanded particles of Example 13.
Figure 5:
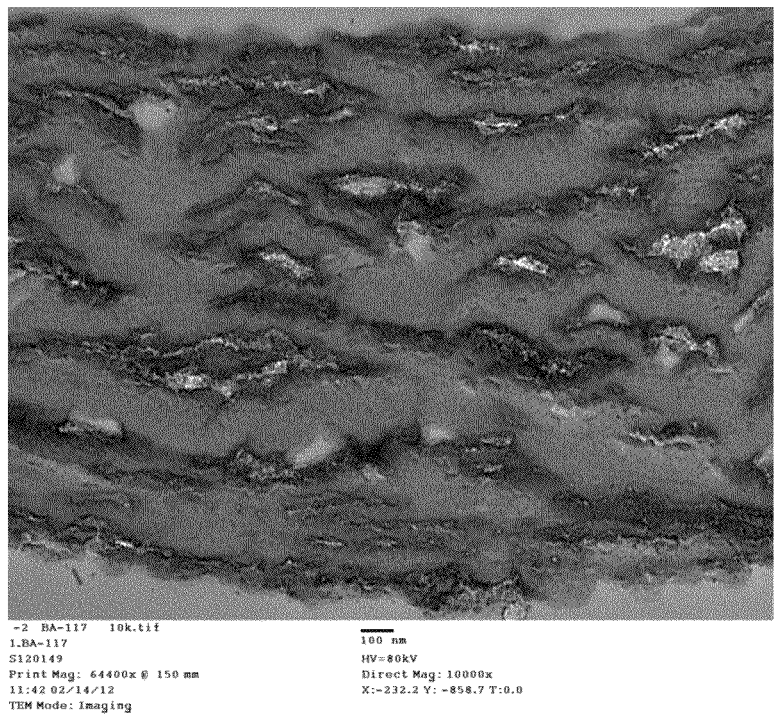
FIG. 5 is a scanning electron microscope (SEM) photograph of the cross-section of the expanded particles of Example 14.
Figure 6:
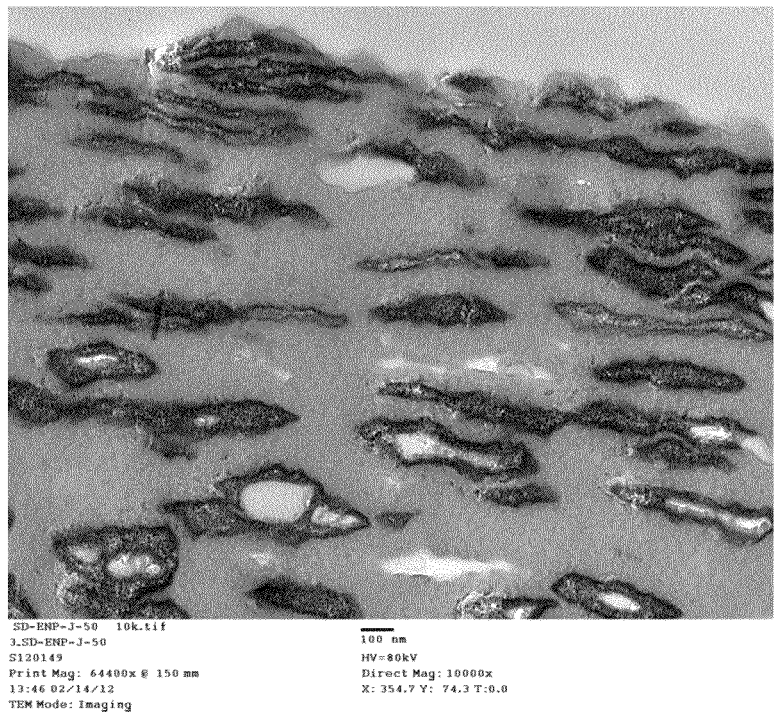
FIG. 6 is a scanning electron microscope (SEM) photograph of the cross-section of the expanded particles of Example 15.
Figure 7:
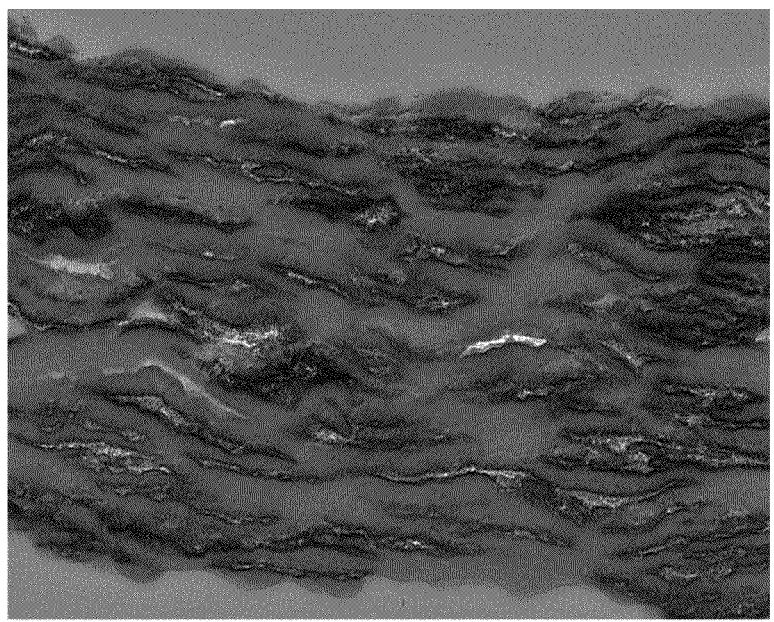
FIG. 7 is a transmission electron microscope (TEM) photograph of the cross-section of the expanded molded article of Example 14.

Also, FIGS. 4 to 6 show scanning electron microscope (SEM) photographs of the cross-section of the expanded particles of Examples 13 to 15 respectively, and FIG. 7 shows a transmission electron microscope (TEM) photograph of the expanded molded article of Example 14.

TABLE 3

| | Composite PS-Based Resin Particles | | | | Expandable Composite PS-Based Resin Particles Loaded Gas | | Expanded Composite PS-Based Resin Particles Evaluation | | | |
|---|---|---|---|---|---|---|---|---|---|---|
| | Core | | | Average | Added | | | | | |
| | Core PS | AE | PS/AE/SM (weight ratio) | PBA (parts by weight) | Particle Diameter (mm) | Type | Amount (wt %/resin particles) | Bulk Density (g/cm$^3$) | Aspect Ratio b/a | Mw × 10$^4$ | Mz/Mw |
| Example 13 | B-1 | Ab | 25/10/65 | 0.5 | 1.08 | a | 8 | 0.02 | 15.2 | 26.1 | 2.35 |
| Example 14 | B-1 | Ab | 25/10/65 | 0.8 | 1.07 | a | 8 | 0.02 | 8.3 | 25.9 | 2.33 |
| Example 15 | B-1 | Ab | 25/10/65 | 1.0 | 1.04 | a | 8 | 0.02 | 8.0 | 28.1 | 2.79 |
| Example 16 | B-1 | Ab | 25/10/65 | 2.0 | 1.05 | a | 8 | 0.02 | 18.1 | 29.0 | 2.87 |
| Example 17 | B-1 | Ab | 25/10/65 | 0.5 | 1.08 | a | 8 | 0.02 | 15.2 | 26.1 | 2.35 |

Core PS: Polystyrene-based resin seed particles
AE: Acrylic acid ester
SM: Styrene monomer (corresponds to polystyrene)
Ab: Butyl acrylate
PBA: Polybutadiene-terminated acrylate
Mw: Weight-average molecular weight
Mz: Z-average molecular weight

TABLE 4

Evaluation of Composite PS-Based Resin Expanded Molded Article

| | Bulk Density (g/cm$^3$) | Aspect Ratio d/c | Mw × 10$^4$ | Mz/Mw | Falling Ball Impact Value (cm) | Bending Fracture Point Displacement (mm) | Cracking Amount (%) | Moldability Steam Pressure Setting | | |
|---|---|---|---|---|---|---|---|---|---|---|
| | | | | | | | | 0.06 MPa | 0.07 MPa | 0.08 MPa |
| Example 13 | 0.02 | 15.7 | 26.5 | 2.47 | 19.5 (⊖) | 19.8 (⊖) | 40.9 (⊖) | ⊖ | ⊖ | ⊖ |
| Example 14 | 0.02 | 10.3 | 26.1 | 2.48 | 17.5 (⊖) | 17.8 (⊖) | 41.9 (⊖) | ⊖ | ⊖ | ⊖ |
| Example 15 | 0.02 | 10.1 | 27.8 | 2.72 | 16.5 (⊖) | 17.9 (⊖) | 42.0 (⊖) | ⊖ | ⊖ | ⊖ |
| Example 16 | 0.02 | 18.3 | 29.0 | 2.86 | 18.5 (⊖) | 17.4 (⊖) | 41.8 (⊖) | ○ | ⊖ | ⊖ |
| Example 17 | 0.02 | 15.7 | 26.5 | 2.47 | 19.5 (⊖) | 19.8 (⊖) | 40.9 (⊖) | ⊖ | ⊖ | ⊖ |

Result of antistatic performance in Example 17: ○

EXPLANATION OF SYMBOLS a: Thickness of the polyacrylic acid alkyl ester-based resin fine particles
b: Length in the cell membrane surface direction of the polyacrylic acid alkyl ester-based resin fine particles
g: Polyacrylic acid alkyl ester-based resin fine particles
t: Cell membrane thickness
1: Test piece
2: Weight
3: Crack
H: Crack dimension
T: Thickness of the test piece

What is claimed is:

1. Expanded composite polystyrene-based resin particles having a plurality of cells and cell membranes separating the plurality of cells, said cell membranes including a polystyrene-based resin forming a continuous phase and polyacrylic acid alkyl ester-based resin fine particles dispersed in said continuous phase to form a dispersed phase, and said polystyrene-based resin being complexed with said polyacrylic acid alkyl ester-based resin fine particles,
wherein said dispersed phase is present in a form of a plurality of layers in a cell membrane thickness direction in a cell membrane cross-section of said expanded composite polystyrene-based resin particles, and
wherein said expanded composite polystyrene-based resin particles further comprise a component derived from a polybutadiene-terminated acrylate, wherein said polybutadiene-terminated acrylate is a monomer having polybutadiene molecules containing repetitive unit (1) by 1,2 bonding and repetitive unit (2) by 1,4 bonding, and functional (meth)acryloyl group represented by formula (3) at one or both terminal ends

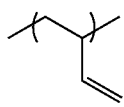
(1)

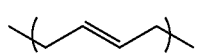
(2)

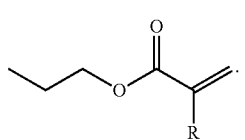
(3)

2. The expanded composite polystyrene-based resin particles according to claim 1, wherein said dispersed phase, when a and b are respectively a dimension in the cell membrane thickness direction (thickness of polyacrylic acid alkyl ester-based resin fine particles) and a dimension in a cell membrane surface direction (length of polyacrylic acid alkyl ester-based resin fine particles) in a cell membrane cross-section of said expanded composite polystyrene-based resin particles, has an aspect ratio (b/a) of 7 or more and 60 or less.

3. The expanded composite polystyrene-based resin particles according to claim 1, wherein said polystyrene-based resin has a weight-average molecular weight ($M_W$) of 200,000 to 350,000 and a ratio ($M_Z/M_W$) of a Z-average molecular weight ($M_Z$) to said weight-average molecular weight ($M_W$) of 2 to 4.

4. The expanded composite polystyrene-based resin particles according to claim 2, wherein said aspect ratio (b/a) is 20 or more and 50 or less.

5. The expanded composite polystyrene-based resin particles according to claim 1, wherein said polyacrylic acid alkyl ester-based resin fine particles are formed from a polymer of ethyl acrylate, butyl acrylate, 2-ethylhexyl acrylate, or a mixture thereof.

6. The expanded composite polystyrene-based resin particles according to claim 1, wherein said polyacrylic acid alkyl ester-based resin fine particles are from 5 to 100 parts by weight with respect to 100 parts by weight of said polystyrene-based resin.

7. The expanded composite polystyrene-based resin particles according to claim 1, wherein said expanded composite polystyrene-based resin particles have a bulk density of 0.015 g/cm³ or more and 0.1 g/cm³ or less.

8. The expanded composite polystyrene-based resin particles according to claim 1, wherein said expanded composite polystyrene-based resin particles are formed by pre-expanding expandable polystyrene-based resin particles containing, with respect to said expandable polystyrene-based resin particles, 2 to 10% by weight of a volatile blowing agent having pentane as a main component.

9. The expanded composite polystyrene-based resin particles according to claim 1, wherein said expanded composite polystyrene-based resin particles are surface-coated with an antistatic agent-containing component.

10. A composite polystyrene-based resin expanded molded article having a plurality of cells and cell membranes separating the plurality of cells, said cell membranes including a polystyrene-based resin forming a continuous phase and polyacrylic acid alkyl ester-based resin fine particles dispersed in said continuous phase to form a dispersed phase, and said polystyrene-based resin being complexed with said polyacrylic acid alkyl ester-based resin fine particles, wherein said dispersed phase is present in a form of a plurality of layers in a cell membrane thickness direction in a cell membrane cross-section of said composite polystyrene-based resin expanded molded article;
wherein said composite polystyrene-based resin expanded molded article is formed from the polystyrene-based resin particles of claim 1.

11. The composite polystyrene-based resin expanded molded article according to claim 10, wherein said dispersed phase, when c and d are respectively a dimension of the cell membrane thickness direction (thickness of polyacrylic acid alkyl ester-based resin fine particles) and a dimension of the cell membrane surface direction (length of polyacrylic acid alkyl ester-based resin fine particles) in a cell membrane cross-section of said composite polystyrene-based resin expanded molded article, has an aspect ratio (d/c) of 7 or more and 60 or less.

12. The composite polystyrene-based resin expanded molded article according to claim 10, wherein said polystyrene-based resin has a weight-average molecular weight (MW) of 200,000 to 350,000 and a ratio (MZ/MW) of a Z-average molecular weight (MZ) to said weight-average molecular weight (MW) of 2 to 4.

13. The composite polystyrene-based resin expanded molded article according to claim 11, wherein said aspect ratio (d/c) is 20 or more and 50 or less.

14. The composite polystyrene-based resin expanded molded article according to claim 10, wherein said polyacrylic acid alkyl ester-based resin fine particles are formed from a polymer of ethyl acrylate, butyl acrylate, 2-ethylhexyl acrylate, or a mixture thereof.

15. The composite polystyrene-based resin expanded molded article according to claim 10, wherein said polyacrylic acid alkyl ester-based resin fine particles are 5 to 100 parts by weight with respect to 100 parts by weight of said polystyrene-based resin.

16. The composite polystyrene-based resin expanded molded article according to claim 10, wherein said composite polystyrene-based resin expanded molded article has a bulk density of 0.015 g/cm3 or more and 0.1 g/cm3 or less.

17. The composite polystyrene-based resin expanded molded article according to claim 10, wherein said composite polystyrene-based resin expanded molded article has a falling ball impact value by JIS K7211 of 11 cm or more, a bending fracture point displacement by JIS K7221-1 of 12 mm or more, and a cracking amount by JIS Z0235 of less than 50%.

18. The composite polystyrene-based resin expanded molded article according to claim 10, wherein said composite polystyrene-based resin expanded molded article is formed by expansion molding expanded composite polystyrene-based resin particles surface-coated with an antistatic agent-containing component.

* * * * *